(12) United States Patent
Kamath et al.

(10) Patent No.: US 11,414,864 B2
(45) Date of Patent: Aug. 16, 2022

(54) PLASTERBOARDS AND METHODS FOR MAKING THEM

(71) Applicant: CertainTeed Gypsum, Inc., Malvern, PA (US)

(72) Inventors: Mithun N. Kamath, Northborough, MA (US); Choung-Houng Lai, Acton, MA (US); Michael J. Lemberger, Dudley, MA (US); Gerald Boydston, Cody, WY (US); Bryan Wiltzius, Largo, FL (US); Eric Dong, Northborough, MA (US); Nathan Frailey, Cody, WY (US)

(73) Assignee: CertainTeed Gypsum, Inc., Malvern, PA (US)

( * ) Notice: Subject to any disclaimer, the term of this patent is extended or adjusted under 35 U.S.C. 154(b) by 0 days.

(21) Appl. No.: 16/231,577

(22) Filed: Dec. 23, 2018

(65) Prior Publication Data
US 2019/0203470 A1 Jul. 4, 2019

Related U.S. Application Data

(60) Provisional application No. 62/611,612, filed on Dec. 29, 2017.

(51) Int. Cl.
*E04C 2/04* (2006.01)
*B28B 19/00* (2006.01)
(Continued)

(52) U.S. Cl.
CPC .......... *E04C 2/043* (2013.01); *B28B 19/0015* (2013.01); *B28B 19/0092* (2013.01); *B32B 3/28* (2013.01); *B32B 13/08* (2013.01); *B32B 27/08* (2013.01); *B32B 27/10* (2013.01); *B32B 2262/101* (2013.01); *B32B 2315/18* (2013.01); *B32B 2607/00* (2013.01); *E04C 2/322* (2013.01)

(58) Field of Classification Search
CPC ..... E04C 2/043; E04C 2/322; B28B 19/0015; B28B 19/0092; B32B 3/28; B32B 13/08; B32B 27/08; B32B 27/10; B32B 2262/101; B32B 2315/18; B32B 2607/00
See application file for complete search history.

(56) References Cited

U.S. PATENT DOCUMENTS 4,020,237 A 4/1977 von Hazmburg
4,310,370 A * 1/1982 Arai .......................... B32B 3/28
156/220

(Continued)

OTHER PUBLICATIONS

Copending U.S. Appl. No. 16/231,576, filed Dec. 23, 2018.

*Primary Examiner* — Nathan L Van Sell
(74) *Attorney, Agent, or Firm* — McDonnell Boehnen Hulbert & Berghoff LLP

(57) ABSTRACT

An example plasterboard includes a layer of hardened plaster material having a first surface and an opposed second surface and a layer of molded material having a surface that faces away from the layer of hardened plaster material. The surface of the layer of molded material has one or more raised features. The plasterboard also includes a liner between the first surface of the layer of hardened plaster material and the layer of molded material. Other examples include a method of forming such plasterboards and a method for installing such plasterboards.

24 Claims, 23 Drawing Sheets

(51) Int. Cl.
  *B32B 3/28*    (2006.01)
  *E04C 2/32*    (2006.01)
  *B32B 13/08*   (2006.01)
  *B32B 27/08*   (2006.01)
  *B32B 27/10*   (2006.01)

(56) References Cited

U.S. PATENT DOCUMENTS

| | | | | |
|---|---|---|---|---|
| 4,614,680 | A * | 9/1986 | Fry | B32B 3/30 |
| | | | | 428/158 |
| 4,631,097 | A * | 12/1986 | Kossuth | B28B 19/0092 |
| | | | | 156/183 |
| 5,188,263 | A | 2/1993 | Woods | |
| 5,443,211 | A | 8/1995 | Young | |
| 5,985,061 | A * | 11/1999 | Doi | B28B 1/522 |
| | | | | 156/220 |
| 6,386,402 | B1 | 5/2002 | Woods | |
| 6,770,354 | B2 | 8/2004 | Randall | |
| 7,374,068 | B2 | 5/2008 | Greer, Jr. | |
| 2002/0020129 | A1 * | 2/2002 | Winter | E04B 1/14 |
| | | | | 52/406.1 |
| 2002/0139082 | A1 * | 10/2002 | DeFord | C04B 28/02 |
| | | | | 52/783.1 |
| 2003/0089061 | A1 * | 5/2003 | DeFord | E04C 2/04 |
| | | | | 52/309.9 |
| 2005/0009428 | A1 * | 1/2005 | Porter | B32B 37/24 |
| | | | | 442/129 |
| 2005/0202258 | A1 | 9/2005 | Swales | |
| 2005/0233657 | A1 * | 10/2005 | Grove | D06N 7/00 |
| | | | | 442/43 |
| 2008/0200086 | A1 * | 8/2008 | Porter | C04B 14/42 |
| | | | | 442/189 |
| 2009/0208714 | A1 | 8/2009 | Currier | |
| 2012/0312489 | A1 * | 12/2012 | Porter | B32B 5/024 |
| | | | | 162/156 |
| 2015/0064488 | A1 * | 3/2015 | Foster | B32B 37/12 |
| | | | | 428/514 |

\* cited by examiner

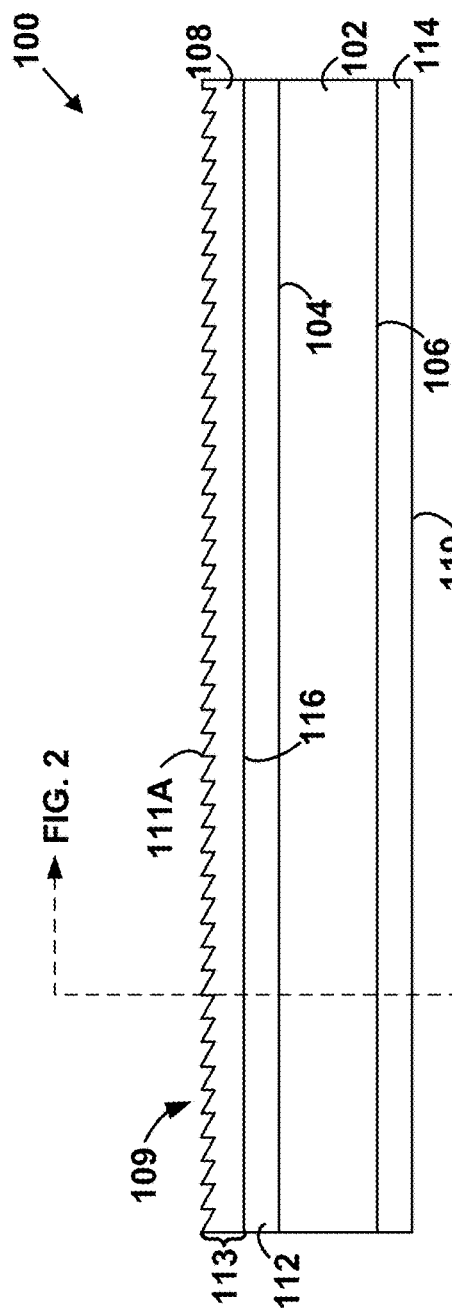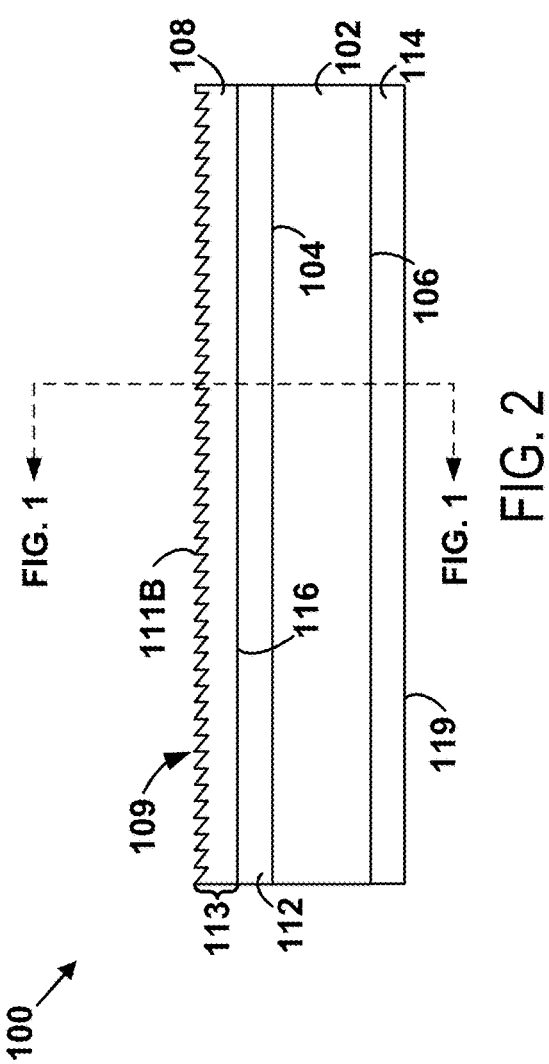

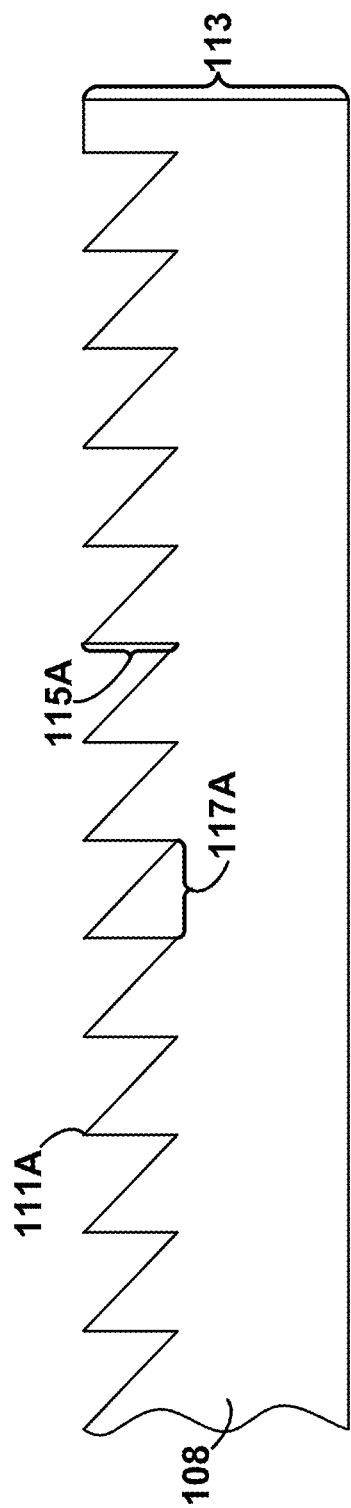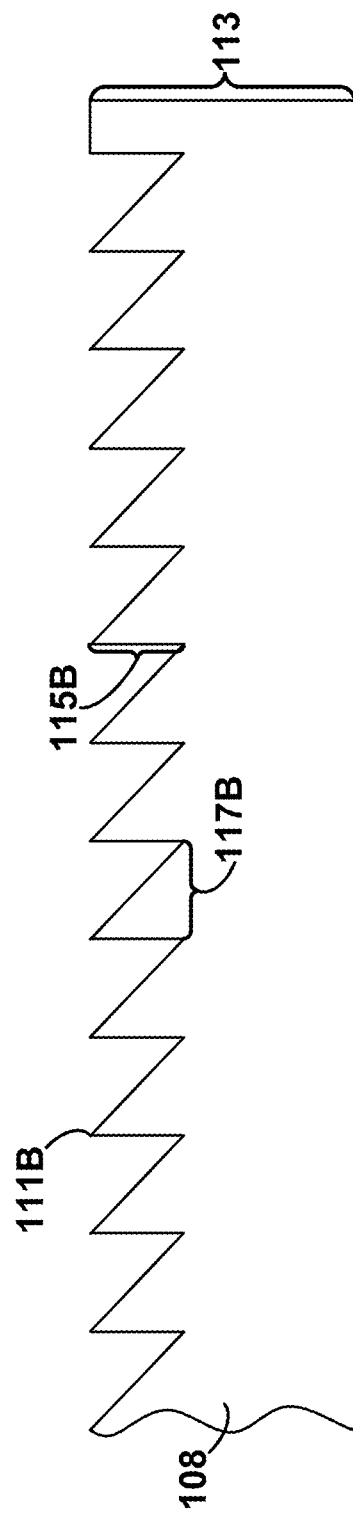

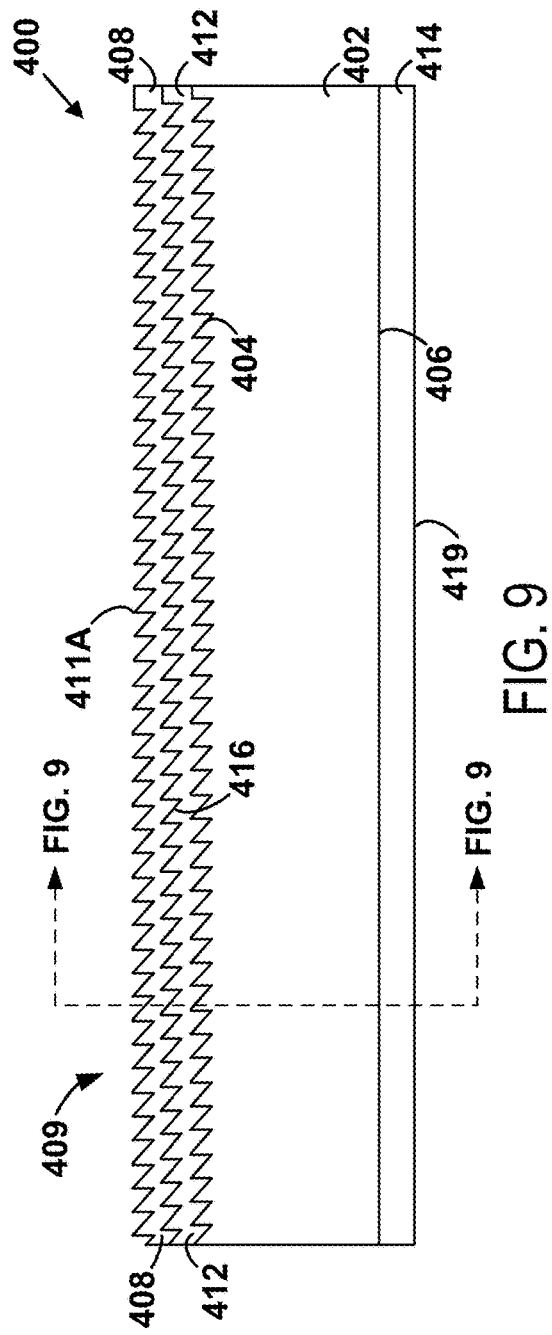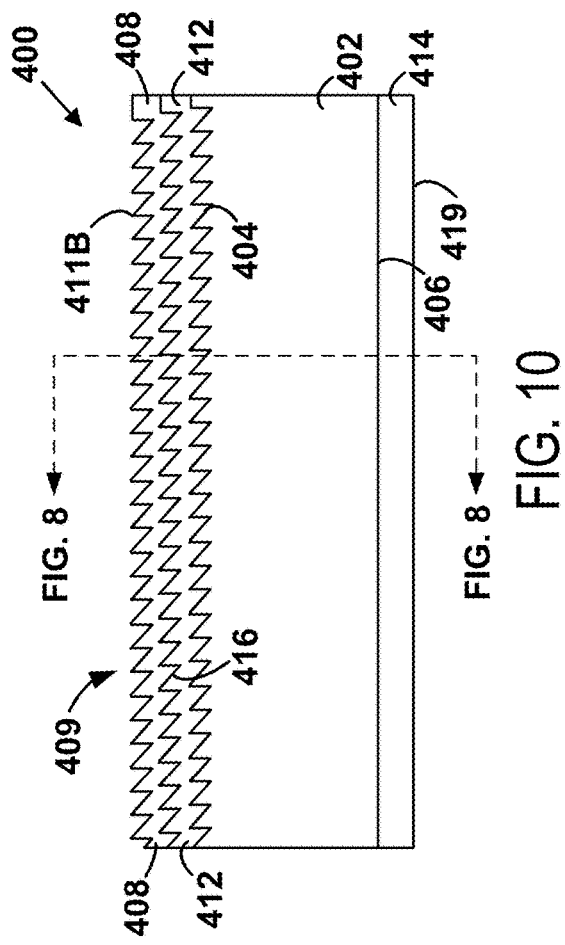

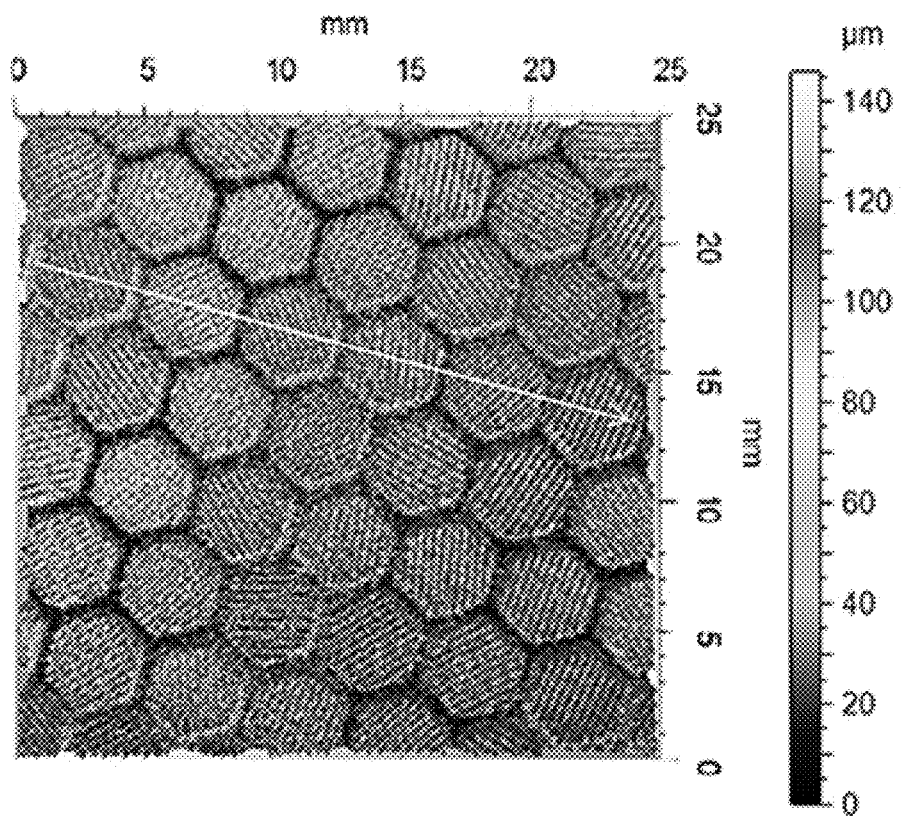
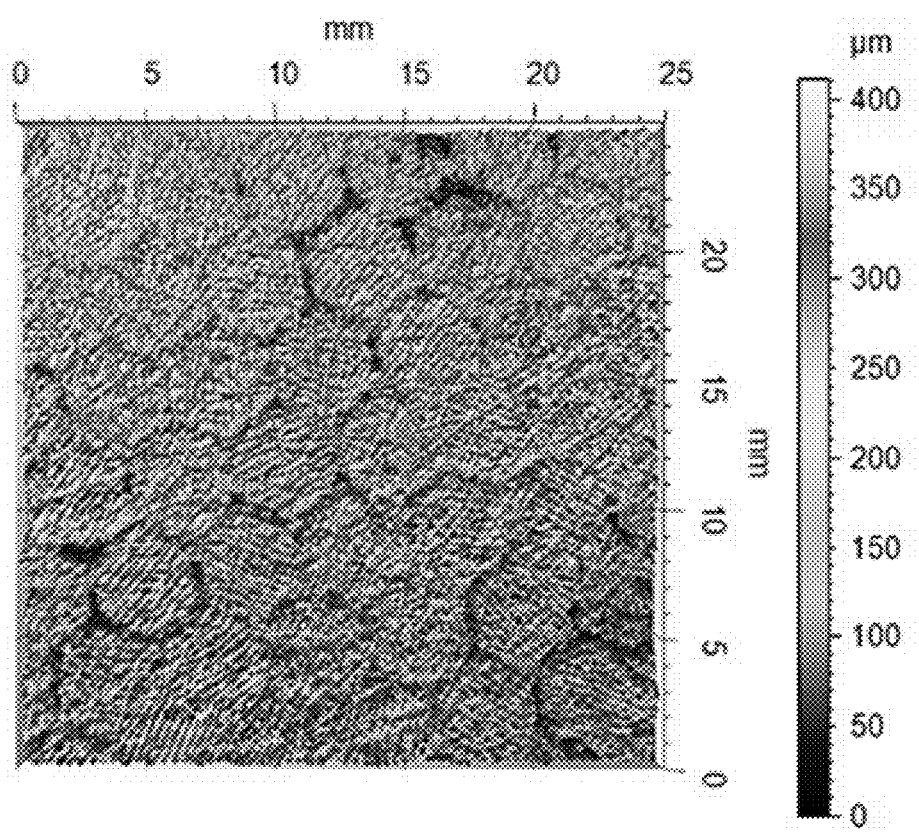
FIG. 22

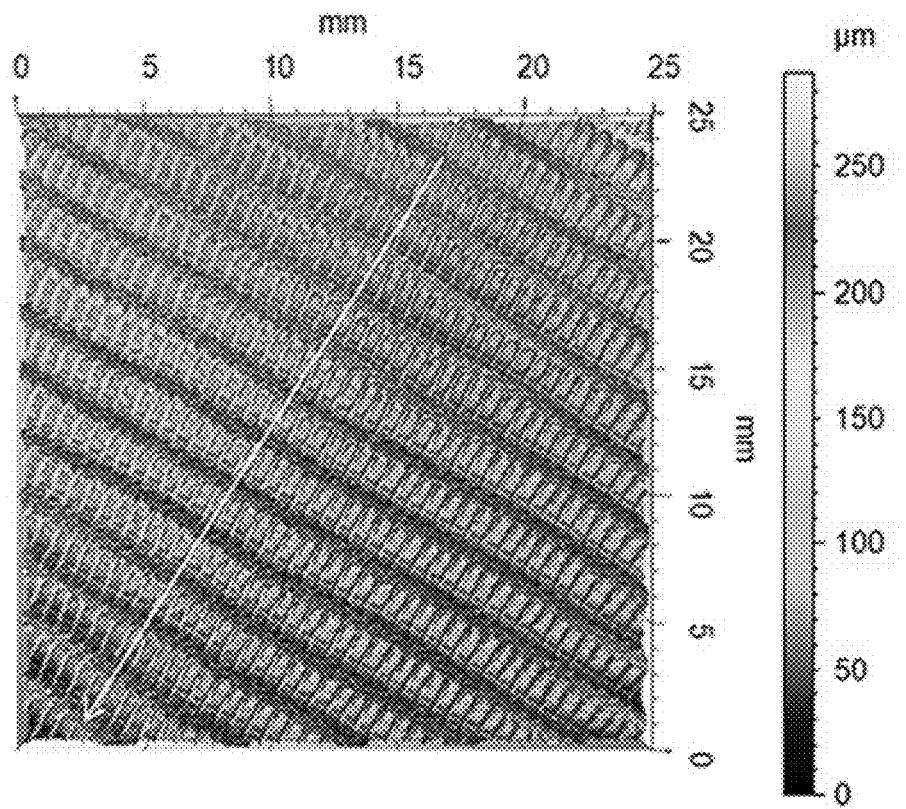
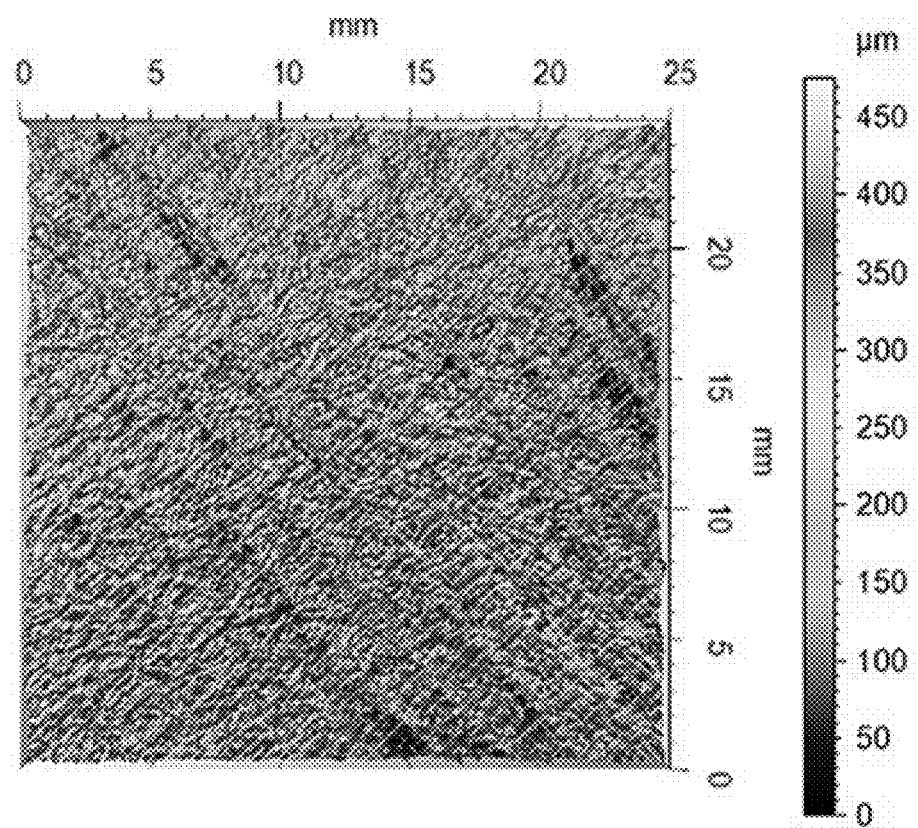
FIG. 24

PLASTERBOARDS AND METHODS FOR MAKING THEM

CROSS-REFERENCE TO RELATED APPLICATIONS

This application claims the benefit of priority of U.S. Provisional Patent Application No. 62/611,612, filed Dec. 29, 2017, which is hereby incorporated herein by reference in its entirety.

BACKGROUND OF THE DISCLOSURE

1. Field of the Disclosure

The present disclosure relates generally to plasterboards and methods for making plasterboards. The present disclosure relates more particularly to plasterboards having a layer of molded material having one or more raised features.

2. Technical Background

Plasterboards, also known as "drywall boards," are typically used to construct walls within, or on the exterior facades of, homes, businesses, or other buildings. Plasterboards are very often made of gypsum, but other materials, including lime and cement, are also used. A typical method for making a plasterboard involves dispensing and spreading a wet plaster material (e.g., a slurry of gypsum in water) onto a paper or fiberglass liner on a platform, and covering the plaster material with another paper or fiberglass liner. This sandwiched structure is fed through extruder plates to provide a structure of a desired thickness and allowed to cure to form a hardened plaster material disposed between the two liners of paper or fiberglass. The plasterboard may be cut into sections having predetermined lengths and widths that conform to accepted construction standards.

Improving thermal insulation in residential or commercial buildings is becoming an ever-increasing concern. Model building codes and design guidelines often specify a minimum thermal resistance value (e.g., R-value) for exterior facades of such buildings. While a number of construction techniques have been used to address this problem, one desirable technique involves bonding an insulation layer (e.g., foam) to an outward-facing surface of a plasterboard that has been attached to the exterior frame of a building. A decorative facade layer can then be applied to the outward-facing surface of the insulation layer. Such insulation layers are often bonded to the plasterboard with a cement-based adhesive. Sometimes, the cement-based adhesive will delaminate from the plasterboard and/or the insulation layer, causing undesirable air gaps between the insulation layer and the plasterboard, or causing the insulation layer to detach from the plasterboard entirely.

Accordingly, what are needed are improved processes for making plasterboards that exhibit improved bonding with cement-based adhesives, and plasterboards amenable for production by such processes with better product quality.

SUMMARY OF THE DISCLOSURE

One aspect of the disclosure is a plasterboard comprising:
a layer of hardened plaster material having a first surface and an opposed second surface;
a layer of molded material having a surface that faces away from the layer of hardened plaster material, the surface of the layer of molded material having one or more raised features; and
a liner between the first surface of the layer of hardened plaster material and the layer of molded material.

Another aspect of the disclosure is a method of forming a plasterboard as described herein, the method comprising:
loading an extruder with a moldable material;
extruding the moldable material through a die to form the layer of molded material on a surface of the liner;
creating the one or more raised features of the layer of molded material;
contacting thereafter, with a layer of wet plaster material, the liner having the molded material applied thereon such that the surface of the liner faces away from the layer of wet plaster material; and
drying the layer of wet plaster material to form the layer of hardened plaster material.

Another aspect of the disclosure is a method of installing a plasterboard as described herein, the method comprising:
securing the plasterboard to an exterior surface of a building such that the layer of molded material faces away from the exterior surface of the building;
applying an adhesive onto the layer of molded material; and
bonding, via the adhesive, a functional layer to the molded material.

Another aspect of the disclosure is a method of installing a functional layer on a plasterboard as described herein, the method comprising:
providing the plasterboard disposed on an exterior surface of a building such that the layer of molded material faces away from the exterior surface of the building;
applying an adhesive onto the layer of molded material; and
bonding, via the adhesive, a functional layer to the molded material.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

FIG. 1 is a schematic cross-sectional view of a plasterboard according to one embodiment of the disclosure.

FIG. 2 is a schematic cross-sectional view of a plasterboard according to another embodiment of the disclosure.

FIG. 4 is a schematic close up view of a plasterboard according to another embodiment of the disclosure.

FIG. 5 is a schematic close up view of a plasterboard according to another embodiment of the disclosure.

FIG. 9 is a schematic cross-sectional view of a plasterboard according to another embodiment of the disclosure.

FIG. 10 is a schematic cross-sectional view of a plasterboard according to another embodiment of the disclosure.

FIG. 22 shows profilometer scans of templates having raised features and corresponding raised features on exposed polymer layers of plasterboards.

FIG. 24 profilometer scans of templates having raised features and corresponding raised features on exposed polymer layers of plasterboards.

DETAILED DESCRIPTION

Figure 3:
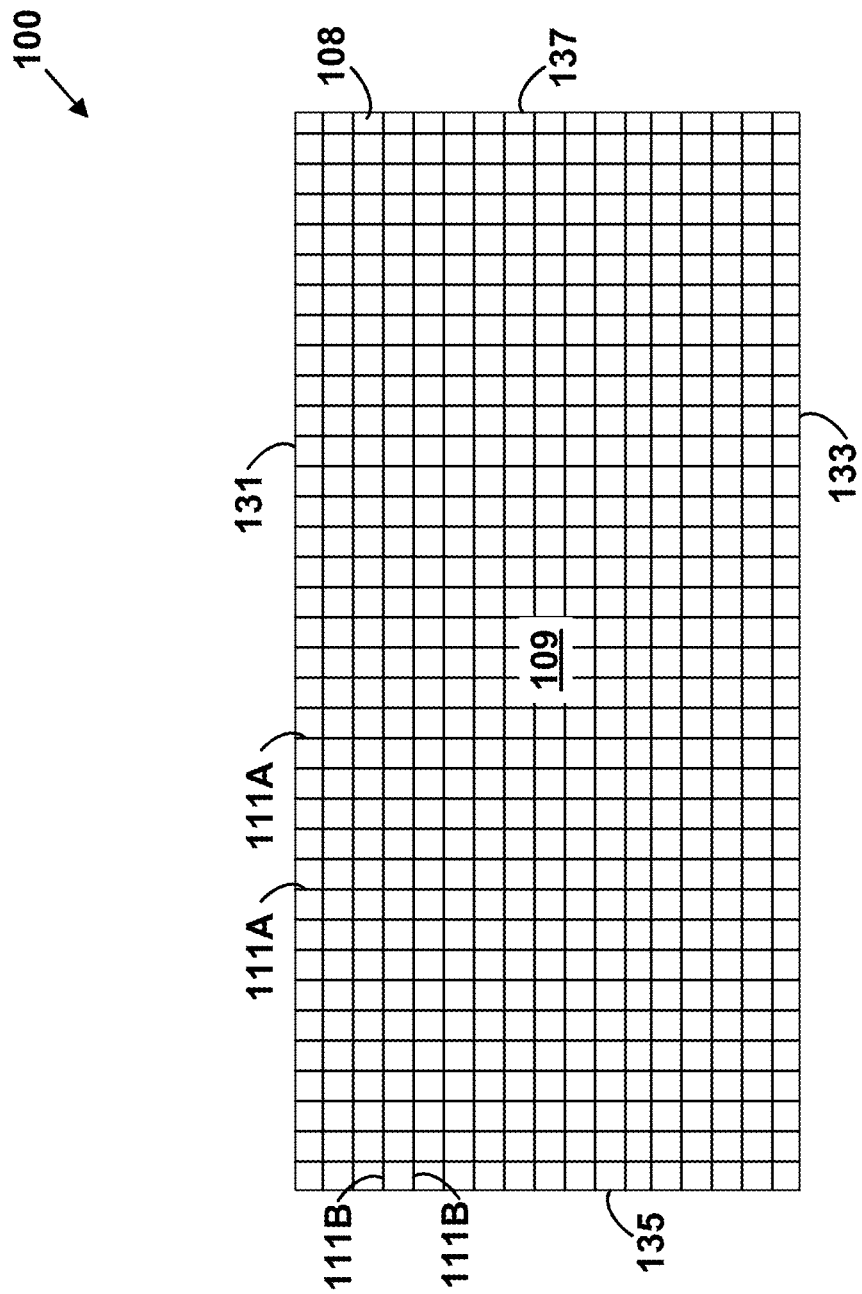
FIG. 3 is a schematic top view of a plasterboard according to another embodiment of the disclosure.

The present inventors have noted disadvantages of currently available plasterboards that are designed for exterior installation (e.g., to be disposed on the exterior of the frame structure of a building). Such plasterboards generally include a layer of hardened plaster material between two liners (e.g., two sheets of water-resistant paper). After the plasterboard is attached to an exterior frame of a building, an insulation layer such as a foam-additive layer can be adhered to the outward-facing liner of the plasterboard. The present inventors have also noted that liners of existing plasterboards too often do not provide a suitable surface for bonding an insulation layer to an outward-facing liner of a plasterboard via application of cement-based adhesive. That is, delamination of the insulation layer from the plasterboard occurs too often.

The present inventors have determined that to address this problem, it is possible to provide raised features at the outward-facing surface of the plasterboard. Such features can provide a textured surface for an adhesive, and thus can improve the adhesion of the insulation layer to the outward-facing surface of the plasterboard.

Accordingly, one aspect of the disclosure is a plasterboard that includes a layer of hardened plaster material (e.g., a gypsum material) having a first surface and an opposed second surface, and a layer of molded material having a surface that faces away from the layer of hardened plaster material. The surface of the layer of molded material has one or more raised features. The plasterboard also includes a liner between the first surface of the layer of hardened plaster material and the layer of molded material. The one or more raised features on the (e.g., exposed) layer of molded material can enhance the ability of a cement-based adhesive to adhere an insulation layer to the plasterboard by providing a textured surface (e.g., to increase the surface area and/or to provide some degree of mechanical interlocking of the plasterboard with the adhesive. The one or more raised features may take the form of ridges or bumps, for example, although the person of ordinary skill in the art will appreciate that a wide variety of surface textures may be provided.

In various embodiments, the first surface of the layer of hardened plaster material and/or the liner have shapes (e.g., profiles) that substantially conform to the one or more raised features of the layer of molded material. However, in other embodiments, the surfaces of the liner and/or the layer of hardened plaster material do not substantially conform to the surface texture of the layer of molded material. For example, in many embodiments, the surfaces of the liner and/or the layer of hardened plaster material remain substantially flat. As the person of ordinary skill in the art will appreciate, the degree to which the surface texture of the layer of molded material is found in the liner and/or the layer of hardened plaster material will depend on the thicknesses of the layer of molded material and the liner, the sizes of the features, and the particular manufacturing technique used to apply the layer of molded material to the liner.

In certain embodiments, the molded material is a polymer material. For example, the molded material can takes the form of or include a thermoplastic material such as ethylene methyl acrylate copolymer. The person of ordinary skill in the art will appreciate that a variety of other thermoplastics may be used, such as ethylene butyl acrylate copolymer, ethylene vinyl acetate copolymer, polyethylene, thermoplastic polyurethane, a styrene acrylic copolymer, an acrylic copolymer, or any combination thereof. In other embodiments, the polymer material of the polymer layer can be a cured coating material (e.g., disposed as a curable formulation and cured by heat and/or radiation). Additionally or alternatively, the polymer layer can include one or more polymers based on (meth)acrylamide, hydroxyl alkyl (meth) acrylate, (meth)acrylic acid, N-(alkoxymethyl)-acrylamide, N-(alkylol)-acrylamide, N-(alkyl)-acrylamide, diacetone (meth) acrylamide, acetoacetoxy alkyl(meth)acrylate or any combination thereof. In various particular embodiments, the thermoplastic layer can include N-(methoxymethyl)-acrylamide, N-(methylol)-acrylamide, N-(n-butoxymethyl)-acrylamide, or any combination thereof. person of ordinary skill in the art will appreciate that other materials could be used to form the polymer layer.

The polymer layer can have a relatively high amount of polymer. In certain embodiments, the polymer layer includes at least 20%, at least 50%, or even at least 70% by weight of one or more polymers. For example, in certain embodiments, the polymer layer includes one or more polymers in an amount in the range of 20-99%, or 20-95%, or 20-90%, or 20-80%, or 20-70%, or 20-40%, or 50-99%, or 50-95%, or 50-90%, or 50-80%, or 50-70%, or 70-99%, or 70-95%, or 70-90%.

The polymer layer can include a variety of other materials. For example, in certain embodiments, the polymer material includes calcium carbonate, aragonite, mica, glass fibers, glass beads, or any combination thereof. But other conventional fillers and additives can also be present.

While polymeric materials as described herein can be suitable for use as a molded material, the person of ordinary skill in the art will appreciate that a variety of other moldable and molded materials can be used. For example, the molded material can be substantially inorganic in nature (e.g., at least 70% by weight, at least 80% by weight, or even at least 90% by weight inorganic). For example, a highly filled inorganic coating (e.g., bound by a small amount of organic binder) can be used as the molded material. Such materials can include, e.g., a mixture of mineral pigment and inorganic adhesive (e.g., a cementitiously-active material) together with a small amount of an organic (e.g., latex) binder. Such materials are described by U.S. Pat. No. 5,112,678, which is hereby incorporated herein by reference in its entirety, and can be provided on a liner and molded by the person of ordinary skill in the art in view of the description herein. Other moldable materials, e.g., moldable plaster materials, can also be used.

In certain embodiments as otherwise described herein, the layer of molded material (e.g., the one or more raised features) covers at least 50% of a surface of the liner that faces away from the first surface of the layer of hardened plaster material. In certain such embodiments, the layer of molded material covers at least 75%, at least 90%, or even at least 95% of a surface of the liner that faces away from the first surface of the layer of the hardened plaster material. As the person of ordinary skill in the art will appreciate based on the present disclosure, an improvement in adhesion can be provided even if the molded material does not completely cover the surface of the liner.

The layer of molded material can be provided in a variety of thicknesses. The person of ordinary skill in the art will select a thickness for the layer of molded material based on, for example, the desired manufacturing technique and the desired feature depth. For example, in certain embodiments as otherwise described herein, the layer of molded material has a thickness within a range of 10 μm to 7000 μm, for example, in a range of 250-2500 μm, or 250-1000 μm, or 400-500 μm, or 50-250 μm, or 50-100 μm, or 25-75 μm, or 400-600 μm, or 1000 μm to 7000 μm.

The raised features can have a variety of depths. The person of ordinary skill in the art will select feature depths to provide a desired degree of texture to the polymer layer surface, for example to provide a desired degree of adhesion, in view of the manufacturing technique used to provide the surface relief. In certain embodiments as otherwise described herein, the one or more raised features include one or more features having a depth in the range of 10-7000 μm. For example, in various embodiments, the one or more raised features include one or more features having a depth within a range of 75 μm to 95 μm, within a range of 50 μm to 115 μm, within a range of 35 μm to 130 μm. In other embodiments, the one or more raised features include one or more features having a depth within a range of 10-3000 μm, or 10-1000 μm, or 10-500 μm, or 10-200 μm, or 20-7000 μm, or 20-3000 μm, or 20-1000 μm, or 20-500 μm, or 20-200 μm, or 50-7000 μm, or 50-3000 μm, or 50-1000 μm, or 50-500 μm, or 50-200 μm, or 100-7000 μm, or 100-3000 μm, or 100-1000 μm, or 100-500 μm, or 500-7000 μm, or 500-3000 μm, or 500-1000 μm, or 1000-7000 μm, or 1000-3000 μm.

The features can be provided in a variety of arrangements or patterns, both regular and irregular. In various examples, the one or more raised features have one or more of a cross-hatched pattern or a honeycomb pattern. In some examples, the one or more raised features include a plurality of raised ridges that are parallel to each other. But the person of ordinary skill in the art will appreciate that these are only examples, and that myriad other arrangements are possible.

Desirably, the features occupy a substantial surface area of the molded layer. For example, in certain embodiments as otherwise described herein, the features occupy at least 10%, at least 20%, or at least 30% of the surface area of the molded layer. In certain embodiments, the features occupy a fraction of the surface area of the molded layer in the range of 10-90%. In certain such embodiments, the features occupy a fraction of the surface area of the molded layer in the range of 20-80%, or 30-70%, or 20-90%, or 30-90%, or.

Similarly, the features desirably occupy a substantial surface area of the overall plasterboard. For example, in certain embodiments as otherwise described herein, the features occupy at least 10%, at least 20%, or at least 30% of the surface area of an exterior-facing surface of the plasterboard. In certain embodiments, the features occupy a fraction of the surface area of an exterior-facing surface of the plasterboard in the range of 10-90%. In certain such embodiments, the features occupy a fraction of the surface area of an exterior-facing surface of the plasterboard in the range of 20-80%, or 30-70%.

The features can be provided with a variety of spacings. For example, in certain embodiments, the features can be provided with an average spacing between features (e.g., a "pitch" for regularly-spaced features) in the range of 0.1 mm to 5 mm. In various such embodiments, the features have an average spacing between features of less than 0.1 mm, or within the range of 0.1 mm to 3 mm, or 0.1 mm to 2 mm, or 0.1 mm to 1 mm, or 0.5 mm to 5 mm, or 0.5 mm to 3 mm, or 0.5 mm to 2 mm, or 1 mm to 5 mm, or 1 mm to 3 mm The person of ordinary skill in the art can, based on the disclosure herein, provide a spacing in conjunction with the feature type and depth to provide a desired degree of adhesion of a cement-based adhesive.

In certain embodiments as otherwise described herein, a plurality of raised features are provided, with a density in the range of at least 50 features per square foot, e.g., at least 100 features, at least 200 features, or even at least 500 features per square foot.

In certain particular embodiments, the one or more raised features include a first plurality of raised ridges that are substantially parallel to each other and a second plurality of raised ridges that are substantially parallel to each other. In this context, the raised ridges of the first plurality might not be parallel with the raised ridges of the second plurality. More specifically, the one or more raised features may, for example, include a first section that includes the first plurality of raised ridges and a second section that includes the second plurality of raised ridges. In this context, the first section may in certain embodiments be adjacent to the second section.

The person of ordinary skill in the art will appreciate that a variety of liner materials may be used in the liner. The person of ordinary skill in the art can select a conventional liner material based on, for example, a desired manufacturing process. For example, in certain embodiments as otherwise described herein, the liner includes (or is) a sheet of paper, such as kraft paper. In other embodiments, the liner includes (or is) a fiberglass mat. In other embodiments, the liner includes (or is) a felt mat. Additionally or alternatively, the liner can include polypropylene, polyethylene, polyethylene terephthalate, or any combination thereof in a woven or non-woven form.

In certain embodiments as otherwise described herein, a functional layer (e.g., a foam-based material, wood, mineral wool, or insulation layer) is bonded (e.g., via a cement-based adhesive) to a surface of the layer of molded material that faces away from the liner. The cement-based adhesive may include one or more of belite, alite, tricalcium aluminate, or brownmillerite (or cementitious reaction product thereof), for example.

In certain embodiments, the layer of molded material (e.g., when it is a polymer layer) includes particles of one or more cementitiously active substances mixed therein. In this context, the functional layer may be bonded to the layer of molded material via a cementitious reaction between the particles of one or more cementitiously active substances and the cement-based adhesive. A variety of cementiously active substances can be used in the polymer layer. For example, in certain embodiments, the cementitously-active substance is an inorganic cementitiously-active substance. The one or more cementitiously-active substances may include, for example, one or more of diatomaceous earth, calcined clay, air floated clay, wollastonite, or granulated blast-furnace slag. In other embodiments, a cement (e.g., containing a calcium aluminate cement or a calcium sulfoaluminate cement) can be used as a cementitiously-active substance. In other embodiments, one or more polar molecules (e.g., molecules having a net electric dipole or multipole moment) can be used as a cementitiously-active substance.

The cementitiously-active substance can be provided in a molded layer (e.g., a polymer layer) in a variety of amounts. The person of ordinary skill in the art will, based on the disclosure herein, provide the cementitiously-active substance in an amount to provide a desired degree of adhesion with a cement-based adhesive. In certain embodiments, the one or more cementitiously-active substances are present in the polymer layer in an amount up to 60%, for example, in an amount up to 30% or an amount up to 25%. In certain embodiments, the one or more cementitiously-active substances are present in the polymer layer in an amount in the range of 1-60%, or 1-30%, or 1-25%, or 1-20%, or 1-15%, or 5-60%, or 5-30%, or 5-25%, or 5-20%, or 5-15%, or 10-60%, or 10-30%, or 10-25%, or 10-20%, or 20-60%, or 20-30%.

In some embodiments, a mass ratio of the particles of one or more cementitiously active substances to the molded material is at least 1%, within a range of 5% to 30%, within a range of 10% to 25%, within a range of 15% to 20%, or is less than or equal to 70%.

In various embodiments, the plasterboard forms part of an exterior facade of a building.

Another aspect of the disclosure is a method of forming plasterboards such as the plasterboards discussed above. The method includes loading an extruder (e.g., a single screw extruder) with the moldable material and extruding (e.g., via a high speed extrusion process) the moldable material through a die (e.g., a film die) to form the layer of molded material on a surface of the liner. The method further includes creating the one or more raised features of the layer of molded material and contacting thereafter, with a layer of wet plaster material, the liner having the molded material applied thereon such that the surface of the liner faces away from the layer of wet plaster material. The method further includes drying the layer of wet plaster material to form the layer of hardened plaster material.

In a "high speed" extrusion process, the moldable material may be extruded at a rate within a range of 50-400 feet per minute (ft/min) (e.g., within a range of 100-400, 200-400, or 300-400 ft/min).

In some embodiments, extruding the moldable material may include extruding the moldable material while heating the moldable material to a temperature within a range of 100° C. to 300° C. (e.g., within a range of 100-270° C., 150-270° C., 200-270° C., or approximately 260° C.

Various embodiments may also involve deploying the liner over a (e.g., water cooled) chill roll while extruding the moldable material onto the surface of the liner and/or using the chill roll to cool (e.g., harden) the moldable material while the moldable material is in contact with the surface of the liner. As such, the liner may be deployed over the chill roll such that the surface of the liner faces the chill roll or faces away from the chill roll.

In this context, one or more raised features of the chill roll may be used to create the one or more raised features of the layer of molded material (e.g., while the layer of molded material is heated and/or is in a formable state).

In particular embodiments, creating the one or more raised features of the layer of molded material includes deploying a sheet having one or more raised features over the chill roll and using the one or more raised features of the sheet to create the one or more raised features of the layer of molded material. The sheet may take the form of or include paper, metal foil, plastic, or a fabric.

In some embodiments, contacting the liner having the molded material applied thereon with the layer of wet plaster material causes the one or more raised features of the molded material to create a surface of the wet plaster material having a shape that substantially conforms to the one or more raised features of the molded material. That is, the shape of the one or more raised features of the molded material may be transferred to the layer of wet plaster material and thereafter dried and hardened.

While particular methods for making the layer of molded material are described above, the person of ordinary skill in the art will appreciate that a wide variety of other coating and molding methods can be used. For example, molding can be performed by forming a layer of a moldable material on a liner, then embossing the layer of moldable material.

Another aspect of the disclosure is a method of installing any of the plasterboards discussed above. The method includes securing the plasterboard to an exterior surface of a building such that the layer of molded material faces away from the exterior surface of the building. The method also includes applying an adhesive onto the layer of molded material and bonding, via the adhesive, a functional layer (e.g., a foam-based additive or insulation layer) to the molded material.

One embodiment of such a plasterboard is described with respect to FIGS. 1-5 below. FIGS. 1-5 each show a different view of a plasterboard 100. As shown in the cross-sectional side views of FIGS. 1 and 2, the plasterboard 100 has a layer of hardened plaster 102 material having a first surface 104 and an opposed second surface 106, and a layer of molded material 108 having a surface 109 that faces away from the layer of hardened plaster material 102. The surface 109 of the layer of molded material 108 has one or more raised features 111A and one or more raised features 111B. The plasterboard 100 also includes a liner 112 between the first surface 104 of the layer of hardened plaster material 102 and the layer of molded material 108. The liner 112 includes a surface 116 that will be discussed below. The plasterboard 100 also includes a liner 114 disposed on the second surface 106 of the layer of hardened plaster material 102. The liners 112 and 114 may respectively take the form of or include a sheet of paper, a fiberglass mat, and/or a felt mat.

As the person of ordinary skill in the art will appreciate, the hardened plaster material described herein may be made using a variety of different inorganic base materials. For example, in certain embodiments of the plasterboards and methods as otherwise described herein, the hardened plaster material comprises a base material that is a gypsum material. In other embodiments of the plasterboards and methods as otherwise described herein, the plaster material comprises a base material that is, for example, lime or cement.

The plasterboards of the present disclosure may be made in a variety of thicknesses. The person of ordinary skill in the art will select a desirable thickness for a particular end use. In certain embodiments of the plasterboards and methods as otherwise described herein, the total thickness of the plasterboard (i.e., between the surface 119 of the liner 114 and the surface 109 of the layer of molded material 108 of FIGS. 1 and 2) is at least 0.25 inches and no more than 2 inches, e.g., in the range of 0.30 inches to 1.25 inch or in the range of 0.5 inch to 1 inch. In certain embodiments, the total thickness of the plasterboard is substantially equal to 0.375 inches. In other particular embodiments, the total thickness of the plasterboard is substantially equal to 0.5 inches. In still other particular embodiments, the total thickness of the plasterboard is substantially equal to 0.625 inches. And in still other particular embodiments, the total thickness of the plasterboard is substantially equal to one inch (e.g., especially when lower density plaster materials are used).

The person of ordinary skill in the art will appreciate, however, that the presently disclosed methods and boards can be of a variety of thicknesses and weights. For example, the board can be a lightweight board ⅝" in thickness with a weight on the order of 1,400 lb/MSF (MSF=1,000 square feet), or can be a lightweight board 1" in thickness with a weight on the order of 2,240 lb/MSF. Generally, boards can be made in any desirable weight, for example, from lightweight (1,200 lb/MSF) to normal weight (2,000 lb/MSF) to heavy weight (3,000 lb/MSF), in any desirable thickness (e.g., ½", ⅝" or 1" thick). And as the person of ordinary skill in the art will appreciate, additional thin layers of plaster material (e.g., gypsum, usually of higher density than the bulk material) can be applied to the outsides of the paper or fiberglass layers cladding the plaster material core, in order to help improve mechanical strength.

As the person of ordinary skill in the art will appreciate, the plasterboard 100 (and the plasterboards 200, 300, 400, and 500 described below) can be formed with any of the features described generally herein, e.g., the thicknesses as described above, and the materials as described above.

As shown in FIGS. 1-3, the layer of molded material 108 covers approximately 100% of the surface 116 of the liner 112 that faces away from the first surface 104 of the layer of hardened plaster material 102. In other examples, the layer of molded material covers at least 50%, at least 75%, at least 90%, or at least 95% of the surface 116 of the liner 112. The molded material 108 may include or take the form of a thermoplastic material, such as ethyl methyl acrylic copolymer.

As shown in FIGS. 1-3, the plasterboard 100 includes one or more raised features 111A and one or more raised features 111B. In the top view of the plasterboard 100 shown by FIG. 3, the one or more raised features 111A are shown to take the form of parallel raised ridges that are substantially parallel to each other, running from the edge 131 to the edge 133. The one or more raised features 111B are shown to take the form of parallel raised ridges that are substantially parallel to each other, running from the edge 135 to the edge 137. The one or more raised features 111A form a saw tooth pattern along the length of the plasterboard 100 and the one or more raised features 111B form a saw tooth pattern along the width of the plasterboard 100. The saw tooth pattern or other shapes of surfaces provided by other types of raised features present in other embodiments provide a surface with enhanced roughness that may help adhesively bond functional layers such as insulation to the plasterboard.

As shown in the close up views of FIGS. 4 and 5, the layer of molded material 108 has a thickness 113 within a range of 10 μm to 7000 μm, for example, in a range of 250-2500 μm, or 250-1000 μm, or 400-500 μm, or 50-250 μm, or 50-100 μm, or 25-75 μm, or 400-600 μm. Additionally, the one or more raised features 111A have a depth 115A within a range of 10-7000 μm, within a range of 75 μm to 95 μm, within a range of 50 μm to 115 μm, within a range of 35 μm to 130 μm, or within a range 20-150 μm. The one or more raised features 111A have a pitch 117A within a range of 0.1 mm to 5 mm, e.g., within a range of 0.1 mm to 3 mm, or 0.1 mm to 2 mm, or 0.1 mm to 1 mm, or 0.5 mm to 5 mm, or 0.5 mm to 3 mm, or 0.5 mm to 2 mm, or 1 mm to 5 mm, or 1 mm to 3 mm, within a range of 2 mm to 3 mm, or within a range of 1 mm to 5 mm. Similarly, the one or more raised features 111B have a depth 115B within a range of 75 μm to 95 μm, within a range of 50 μm to 115 μm, within a range of 35 μm to 130 μm, or within a range 20-150 μm. The one or more raised features 111B have a pitch 117B within a range of 0.1 mm to 5 mm, for example, within a range of 0.1 mm to 3 mm, or 0.1 mm to 2 mm, or 0.1 mm to 1 mm, or 0.5 mm to 5 mm, or 0.5 mm to 3 mm, or 0.5 mm to 2 mm, or 1 mm to 5 mm, or 1 mm to 3 mm.

Figure 6:
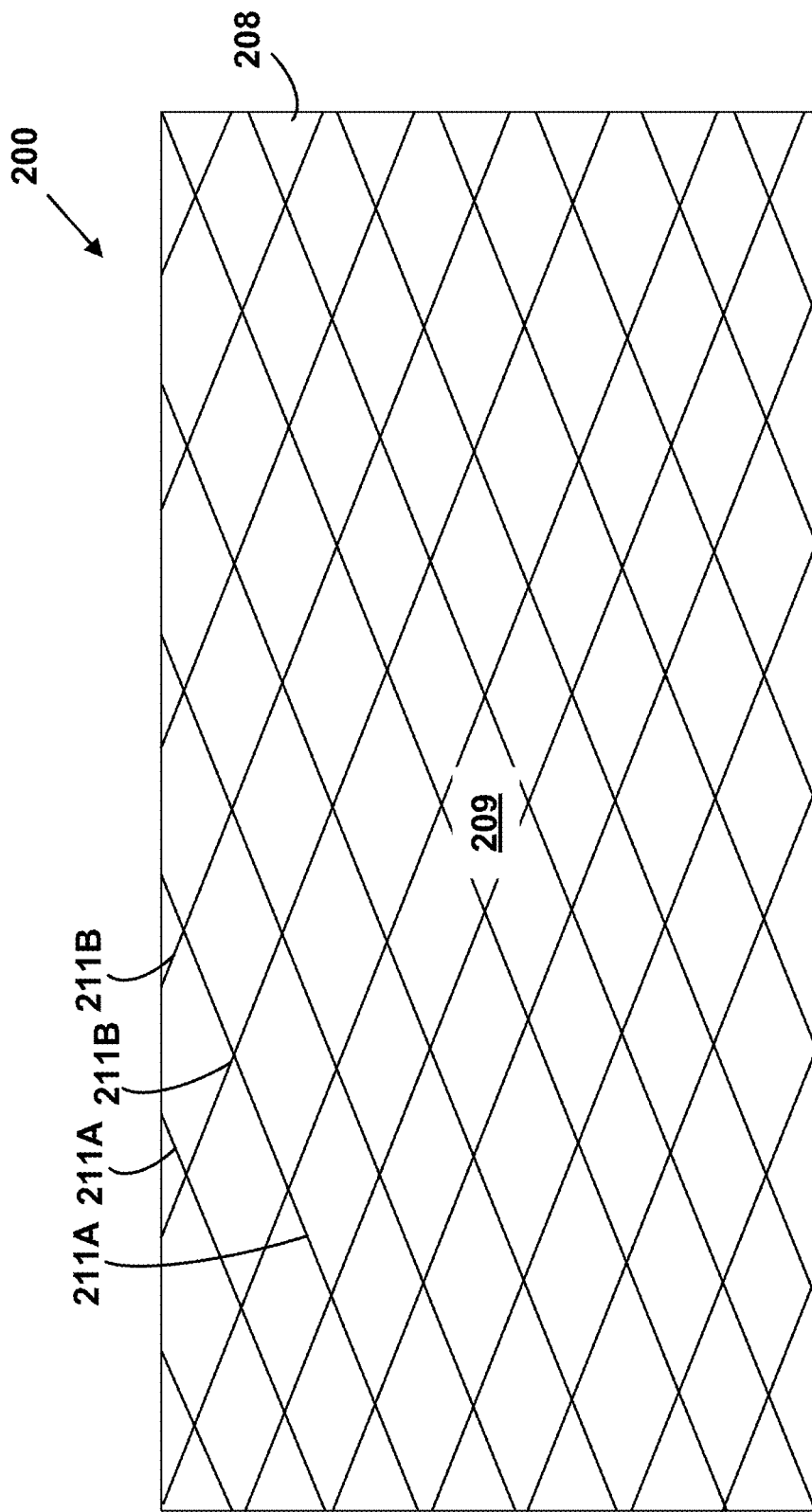
FIG. 6 is a schematic top view of a plasterboard according to another embodiment of the disclosure.

FIG. 6 shows an alternate embodiment of a plasterboard, namely the plasterboard 200. The plasterboard 200 may have any or all features of the plasterboard 100, subject to the differences discussed below. FIG. 6 is a top view of the plasterboard 200, showing a top surface 209 that is situated similarly to the surface 109 of the plasterboard 100. The surface 209 of the layer of molded material 208 includes one or more raised features (e.g., ridges) 211A that span in parallel from lower-left to upper-right, and one or more raised features (e.g., ridges) 211B that span in parallel from upper-left to lower-right. The one or more raised features 211A and the one or more raised features 211B form a cross-hatched pattern.

Figure 7:
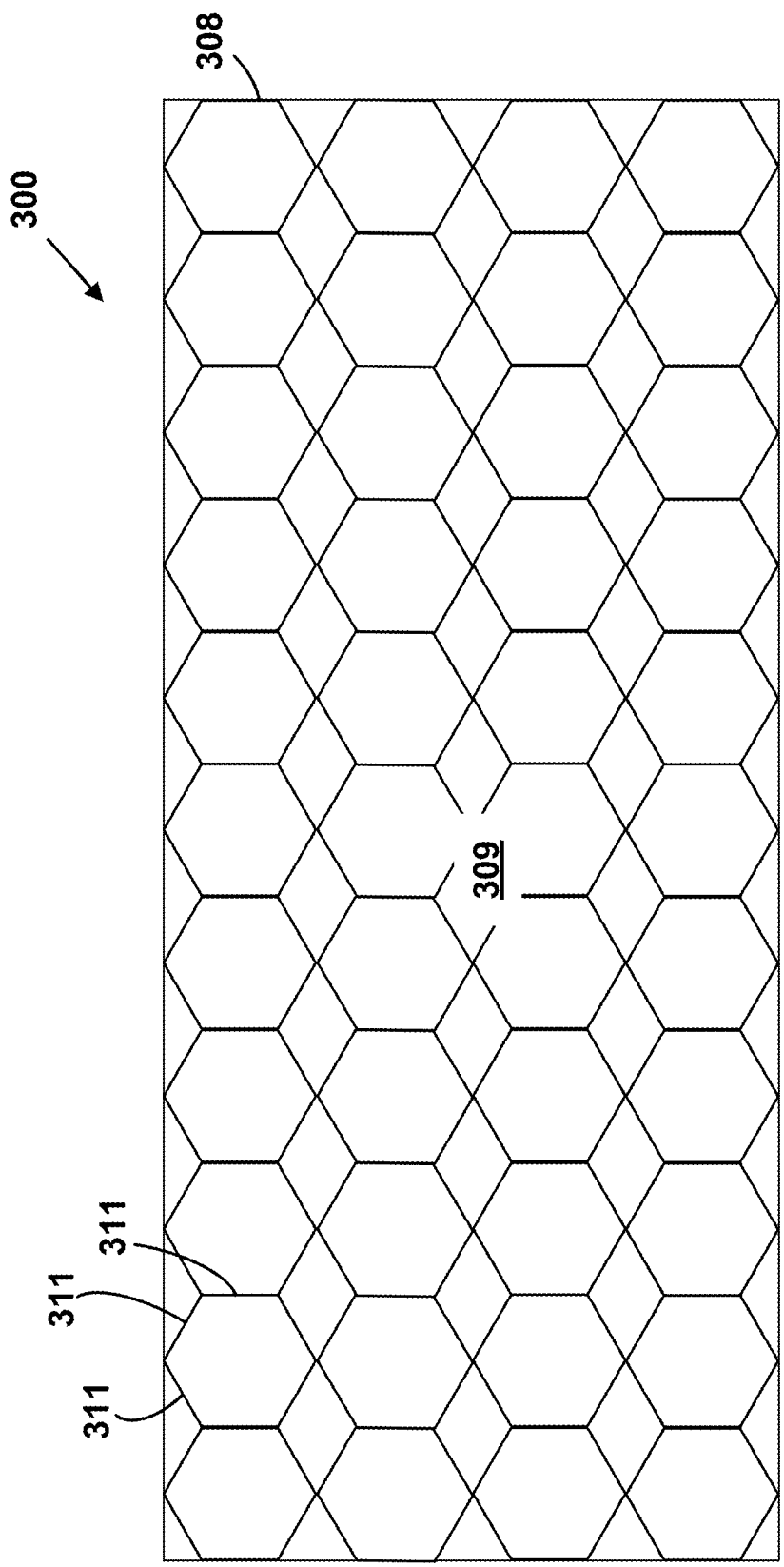
FIG. 7 is a schematic top view of a plasterboard according to another embodiment of the disclosure.

FIG. 7 shows an alternate embodiment of a plasterboard, namely the plasterboard 300. The plasterboard 300 may have any or all features of the plasterboards 100 and/or 200, subject to the differences discussed below. FIG. 7 is a top view of the plasterboard 300, showing a top surface 309 that is situated similarly to the surface 109 of the plasterboard 100. The surface 309 of the layer of molded material 308 includes one or more raised features (e.g., ridges) 311 that form a honeycomb pattern.

Figure 8:
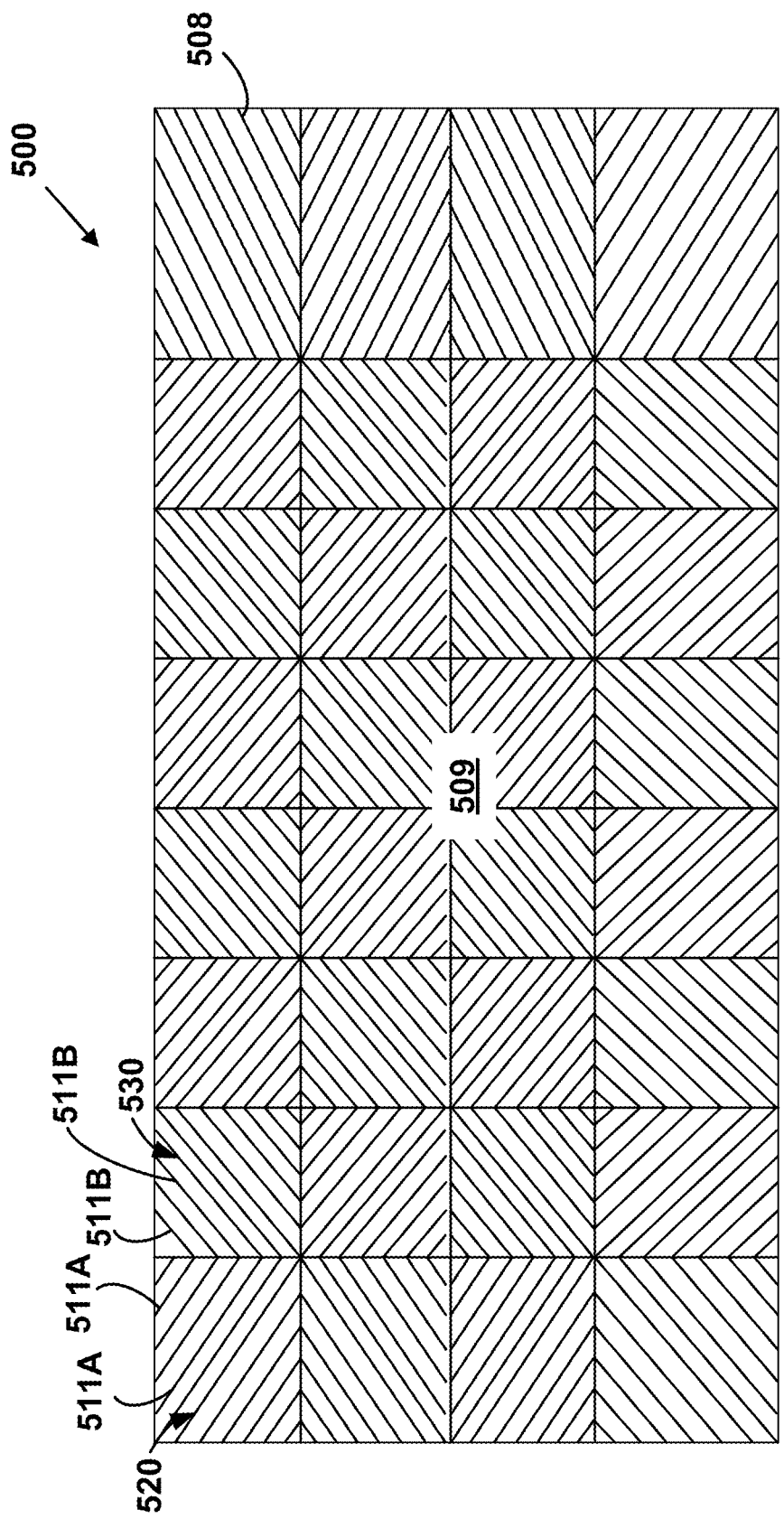
FIG. 8 is a schematic top view of a plasterboard according to another embodiment of the disclosure.

FIG. 8 shows yet another embodiment of a plasterboard, namely the plasterboard 500. The plasterboard 500 may have any or all features of the plasterboards 100, 200, and/or 300, subject to the differences discussed below. FIG. 8 is a top view of the plasterboard 500, showing a top surface 509 that is situated similarly to the surface 109 of the plasterboard 100. The surface 509 of the layer of molded material 508 includes one or more raised features (e.g., ridges) 511A that span (e.g., in parallel) from upper-left to lower-right, and one or more raised features (e.g., ridges) 511B that span (e.g., in parallel) from lower-left to upper-right. The one or more raised features 511A and the one or more raised features 511B may be organized into (e.g., adjacent) sections, such as the section 520 and the section 530. As shown, the one or more raised features 511A are not in parallel with the one or more raised features 511B.

FIGS. 9 and 10 show yet another embodiment of a plasterboard, namely the plasterboard 400. The plasterboard 400 may have any or all features of the plasterboards 100, 200, 300, and/or 500, subject to the differences discussed below. The plasterboard 400 has a layer of hardened plaster material 402 having a first surface 404 and an opposed second surface 406, and a layer of molded material 408 having a surface 409 that faces away from the layer of hardened plaster material 402. The surface 409 of the layer of molded material 408 has one or more raised features 411A and one or more raised features 411B. The plasterboard 400 also includes a liner 412 between the first surface 404 of the layer of hardened plaster material 402 and the layer of molded material 408. The liner 412 includes a surface 416. The plasterboard 400 also includes a liner 414 disposed on the second surface 406 of the layer of hardened plaster material 402. The liners 412 and 414 may respectively take the form of or include a sheet of paper, a fiberglass mat, and/or a felt mat. As shown in side cross-sectional views of FIGS. 9 and 10, the first surface 404 of the layer of hardened plaster material 402 and the liner 412 have shapes that substantially conform to the one or more raised features 411A and the one or more raised features 411B of the layer of molded material 408.

Figure 11:
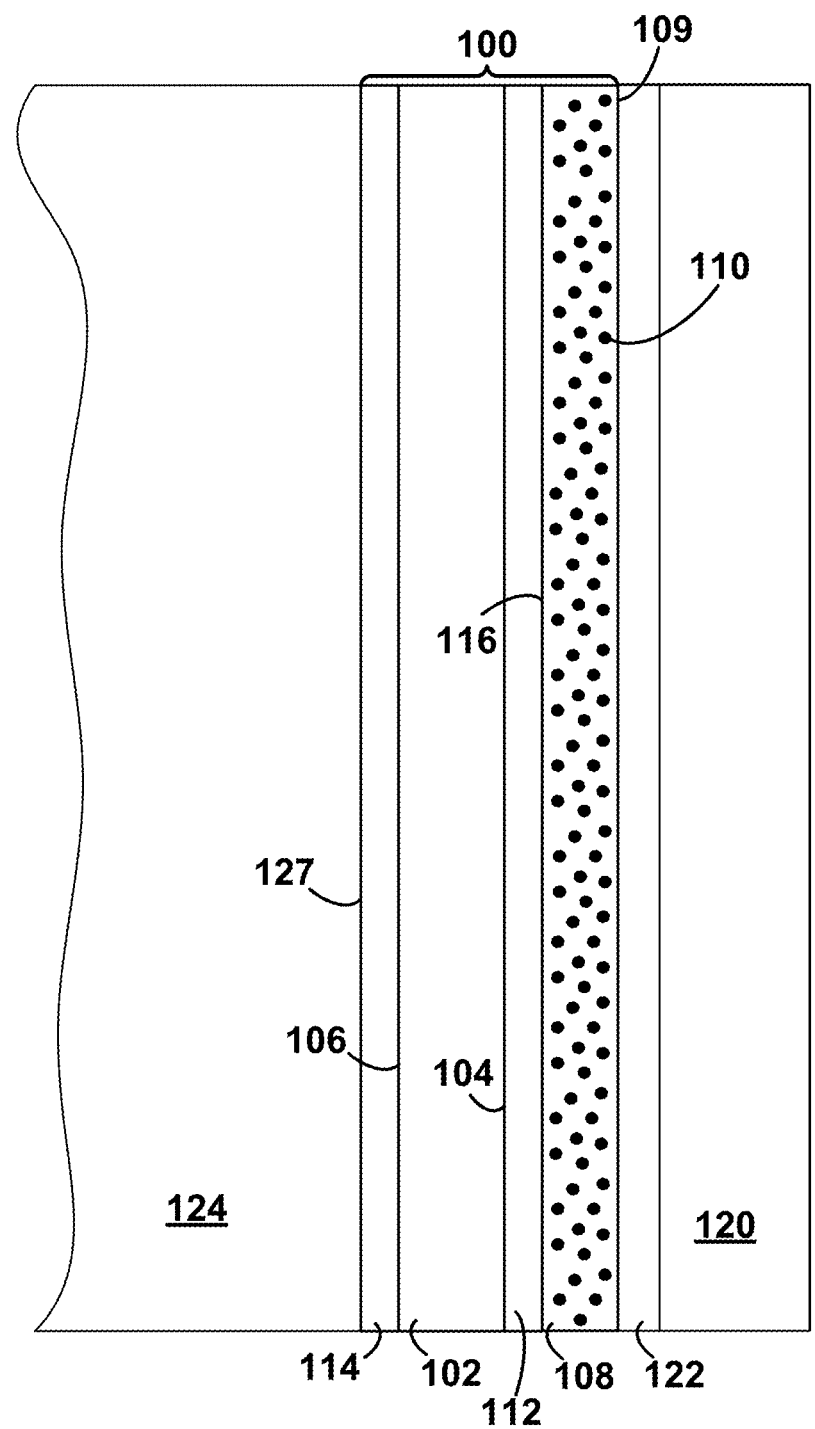
FIG. 11 is a schematic side view of a plasterboard attached to an exterior frame of a building according to another embodiment of the disclosure.

FIG. 11 is a side view of the plasterboard 100 attached (e.g., via nails, screws, other fasteners, or an adhesive) to an exterior frame 124 of a building. More specifically, the liner 114 is in contact with (e.g., adhered to) the exterior frame 124. A functional layer 120 is bonded, via a cement-based adhesive 122, to the surface 109 of the layer of molded material 108 that faces away from the liner 112. The functional layer 120 is bonded to the layer of molded material 108 via a cementitious reaction between particles 110 of one or more cementitiously active substances disposed within the layer of molded material 108 and the cement-based adhesive 122. The cement-based adhesive 122 includes one or more of belite, alite, tricalcium aluminate, or brownmillerite. The functional layer 120 may take the form of or include a layer of foam-based additive (e.g., foam insulation). The bonding of the cement-based adhesive 122 to the surface 109 may also be enhanced by the one or more raised features 111A (not shown in FIG. 11) and the one or more raised features 111B (not shown in FIG. 11).

The particles 110 of one or more cementitiously active substances may include particles of polar molecules, i.e., molecules that have a net electric dipole or multipole moment. Additionally or alternatively, the particles 110 of one or more cementitiously active substances may include and/or be composed of one or more of diatomaceous earth, calcined clay, air floated clay, or granulated blast-furnace slag. A mass ratio of the particles 110 of one or more cementitiously active substances to the molded material 108 may be at least 1%, may be within a range of 5% to 30%, may be within a range of 10% to 25%, may be within a range of 15% to 20%, or may be less than or equal to 70%.

Figure 12:
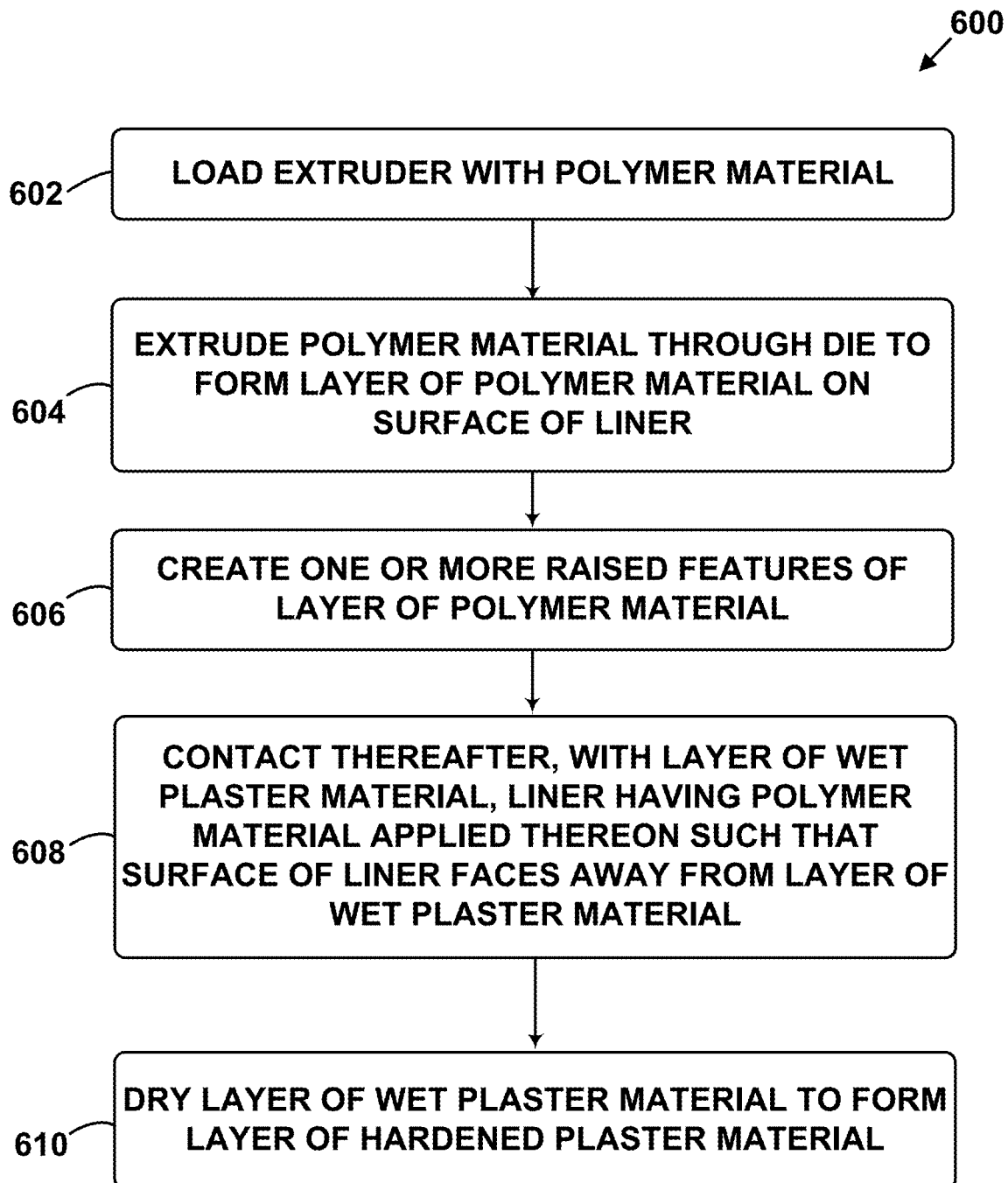
FIG. 12 is a block diagram of a method of forming a plasterboard according to another embodiment of the disclosure.

FIG. 12 is a block diagram of a method 600 of forming a plasterboard. The method 600 may be used to form the plasterboards 100, 200, 300, 400, or 500, for example.

Figure 13:
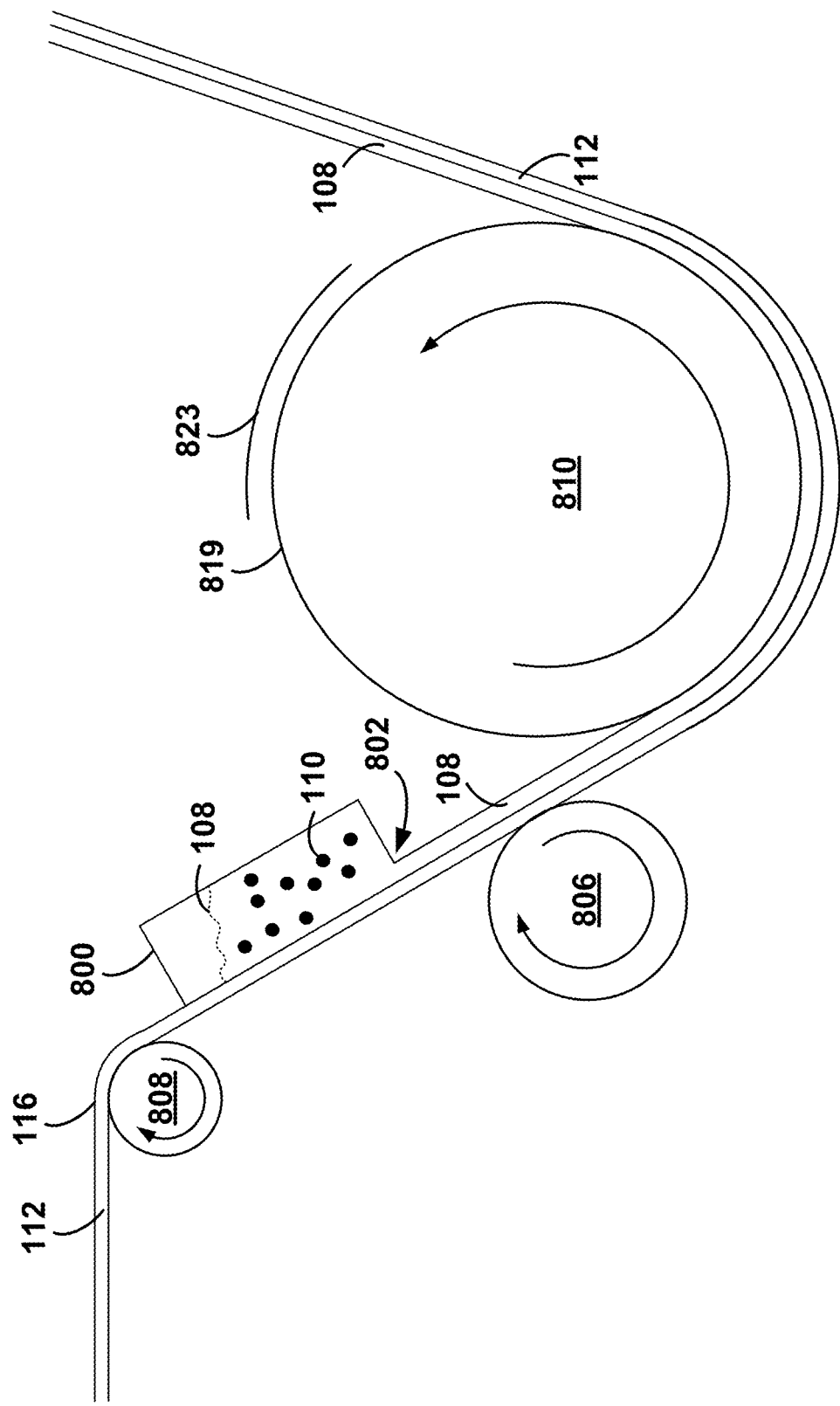
FIG. 13 is a schematic depiction of forming a plasterboard according to another embodiment of the disclosure.

At block 602, the method 600 includes loading an extruder (e.g., a single screw extruder) with the moldable material (e.g., having particles of one or more cementitiously active substances mixed therein). As shown in FIG. 13, an extruder 800 is loaded with the moldable material 108 having particles 110 of one or more cementitiously active substances mixed therein. The extruder 800 is positioned to dispense the (heated) moldable material 108 having the particles 110 of one or more cementitiously active substances mixed therein onto the surface 116 of the liner 112.

At block 604, the method 600 includes extruding the moldable material through a die (e.g., a film die) to form the layer of moldable material on a surface of the liner. As shown in FIG. 13, the moldable material 108 may be extruded (e.g., pushed) through a die 802 of the extruder 800 to form the (e.g. sheet-like) layer of molded material 108 on the surface 116 of the liner 112. In some examples, extruding the moldable material 108 includes extruding the moldable material 108 while heating the moldable material 108 to a temperature within a range of 150° C. to 300° C. In some examples, a high speed extrusion process may be used. As shown in FIG. 13, the liner 112 is deployed over a roller 808 and a roller 806 to facilitate forming the layer of molded material 108 with a somewhat uniform thickness over the surface 116 of the liner 112.

At block 606, the method 600 includes creating the one or more raised features of the layer of molded material.

For example, the one or more raised features 111A, 111B, 211A, 211B, 311, 411A, 411B, 511A, or 511B may be created by using one or more raised features of a chill roll 810 to create the one or more raised features of the layer of molded material 108. For instance, the chill roll 810 may take the form of a barrel-like roller with a radial external surface 819 having a texture (e.g., surface relief) that matches the one or more raised features 111A, 111B, 211A, 211B, 311, 411A, 411B, 511A, or 511B. As the surface 116 of the liner 112 is moved over the radial external surface 819, the one or more raised features 111A, 111B, 211A, 211B, 311, 411A, 411B, 511A, or 511B are formed on the surface 116 (e.g., while the molded material 108 is formable before cooling).

Alternatively, creating the one or more raised features of the layer of molded material may be accomplished using a sheet having a texture (e.g., surface relief) matching the one or more raised features of the layer of molded material. For instance, such a sheet 823 (only a portion of which is shown in FIG. 13) may be deployed over the radial external surface 819 of the chill roll 810. Thereafter, the surface 116 of the liner 112 may be deployed over the sheet 823 on the chill roll 810 to create the one or more raised features 111A, 111B, 211A, 211B, 311, 411A, 411B, 511A, or 511B. The sheet may be formed of or include one or more of paper, metal foil, plastic, or a fabric.

As shown in FIG. 13, the method 600 may involve deploying the liner 112 over the chill roll 810 (e.g., a water-cooled chill roll) while extruding the moldable material 108 onto the surface 116 of the liner 112. The chill roll 810 may take the form of a barrel-like roller with a circulated water cooling system. For example, the chill roll 810 may be used to cool the moldable material 108 while the moldable material 108 is in contact with the surface 116 of the liner 112 (e.g., to solidify the layer of molded material 108 upon the surface 116). As such, the method 600 may involve deploying the liner 112 such that the surface 116 of the liner 112 faces the chill roll 810. In other embodiments, the surface 116 of the liner faces away from the chill roll 810.

Figure 14:
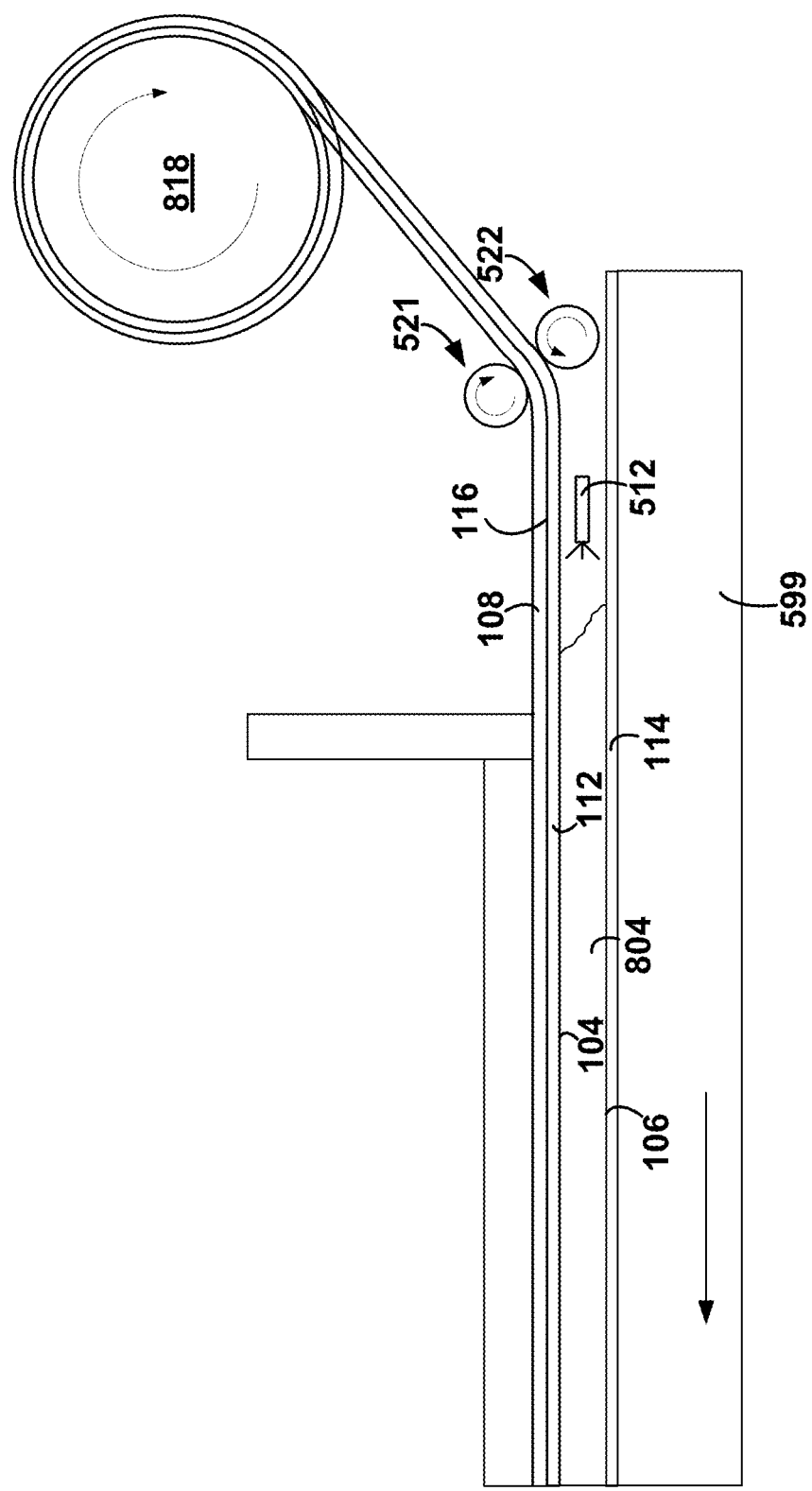
FIG. 14 is a schematic depiction of forming a plasterboard according to another embodiment of the disclosure.

At block 608, the method 600 includes contacting thereafter, with a layer of wet plaster material, the liner having the molded material applied thereon such that the surface of the liner faces away from the layer of wet plaster material. As shown in FIG. 14, this may involve contacting with a layer of wet plaster material 804, the liner 112 having the (e.g., solidified) molded material 108 applied thereon such that the surface 116 of the liner faces away from the wet plaster material 804.

For example, the layer of wet plaster material 804 is provided (e.g., dispensed by dispenser 512) on a platform or conveyor 599. The layer of wet plaster material 804 is a wet, formable plaster material that can harden into the layers of hardened plaster material 102 shown in FIGS. 1 and 2. The layer of wet plaster material 804 can be, for example, a gypsum slurry or another type of slurry. In other embodiments, the layer of wet plaster material is a wet lime material or a wet cement material. But the person of ordinary skill in the art will appreciate that a variety of wet plaster materials can be used in the practice of the processes as described herein. The layer of wet plaster material can include any additives or fillers familiar to the person of ordinary skill in the art, including those described above with respect to the layer of hardened plaster material. The layer of wet plaster material is desirably a semiliquid or otherwise formable mixture that can be, for example, dispensed and spread onto a surface such as a platform or conveyor.

Some examples involve dispensing (e.g., via the dispenser 512) the layer of wet plaster material 804 onto a platform 599. The platform 599 may be a stationary platform like a table in some examples. In other examples, the platform 599 may take the form of a moving conveyor and dispensing the layer of wet plaster material 804 may involve dispensing the layer of wet plaster material 804 onto the conveyor as the conveyor moves from right to left (e.g., with reference to FIG. 14). As the person of ordinary skill in the art will appreciate, a length of paper, fiberglass mat or fabric, or other backing material may be disposed on the platform, such that the wet plaster material is dispensed on and spread onto the backing material (e.g., liner). In such embodiments, the paper, fiberglass, or other backing material will remain at the surface of the plasterboard, as is conventional for wallboard materials.

For example, in the embodiment of FIG. 14, the liner 114 is disposed on the platform 599 (here, a conveyor travelling from right to left as indicated by the arrow.) The layer of wet plaster material 804 is dispensed on the liner 114 (i.e., on the platform 599) via the dispenser 512. The process can be run continuously, like conventional gypsum wallboard manufacturing processes.

The liner 112 with the layer of molded material 108 disposed thereon can be disposed on top of the layer of wet plaster material 804, as shown in FIG. 14. For example, after the formation of the layer of molded material 108 on the liner 112 as shown in FIG. 13, the liner 112 may be rolled up on a spool 818. Next, the liner 112 may be unfurled and fed between a roller 521 and a roller 522 such that the liner 112 is placed onto the layer of wet plaster material 804 as the platform 599 moves the layer of wet plaster material 804 from right to left as shown in FIG. 14.

In some embodiments, contacting the liner having the molded material applied thereon with the layer of wet plaster material causes the one or more raised features of the molded material to create a surface of the wet plaster material having a shape that substantially conforms to the one or more raised features of the molded material. For example, contacting the liner 112 having the molded material 108 applied thereon with the layer of wet plaster material 804 may cause the one or more raised features of the molded material to create a surface 104 of the layer of wet plaster material 804 having a shape that substantially conforms to the one or more raised features of the molded material (e.g., a surface that substantially conforms to the one or more raised features 111A, 111B, 211A, 211B, 311, 411A, 411B, 511A, or 511B).

At block 610, the method includes drying the layer of wet plaster material to form the layer of hardened plaster material. For example, the layer of wet plaster material 804 may be dried to form the layer of hardened plaster material 102 shown in FIGS. 1 and 2. The layer of wet plaster material can be heated (e.g., via an oven or a radiant heater) and/or generate its own heat via an exothermic reaction. Accordingly, during the hardening process, the layer of wet plaster material is desirably at a temperature in excess of 70° C. for at least 20 minutes. If the heat formed by the hardening of the plaster material is insufficient, additional heat can be applied. For example, the layer of wet plaster material can be at a temperature between 70° C. and 130° C. for a duration of at least 20 minutes.

Figure 15:
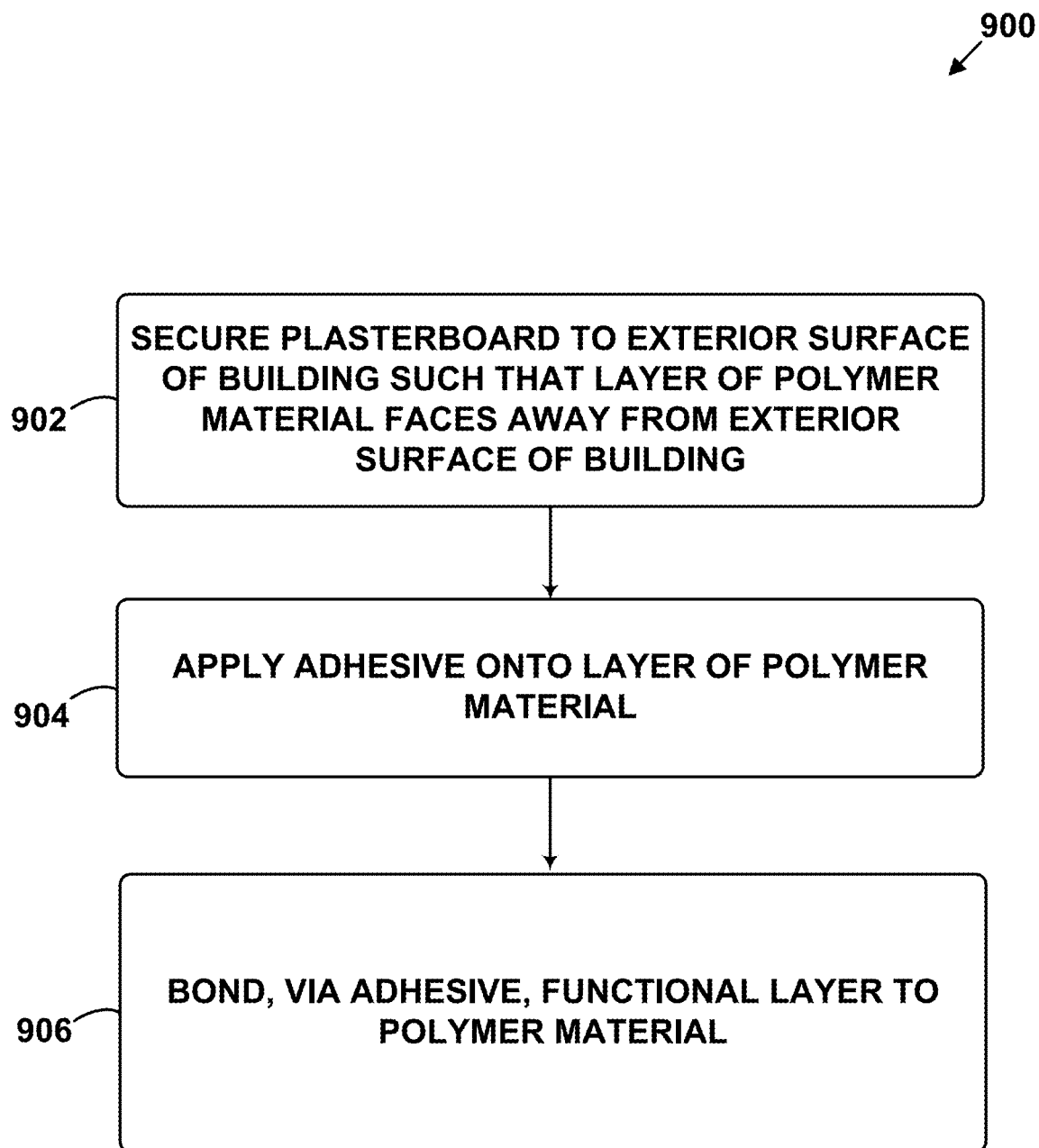
FIG. 15 is a block diagram of a method for installing a plasterboard according to another embodiment of the disclosure.

FIG. 15 is a block diagram of a method 900 of installing a plasterboard. The method 900 may be used to install the plasterboard 100 to the external frame 124 shown in FIG. 11, for example.

At block 902, the method 900 includes securing the plasterboard to an exterior surface of a building such that the layer of molded material faces away from the exterior surface of the building. Referring to FIG. 11, for example, the plasterboard 100 may be secured (e.g., via nails, screws, other fasteners, or an adhesive) to an exterior surface 127 of the external frame 124 such that the layer of molded material 108 faces away from the exterior surface 127 of the building. More specifically, the liner 114 may be in contact with (e.g., adhered to) the exterior surface 127 after the plasterboard 100 is secured to the exterior surface 127.

At block 904, the method 900 includes applying an adhesive onto the layer of molded material. For example, the cement-based adhesive 122 may be applied onto the layer of molded material 108 with a trowel, preferably after the plasterboard 100 is secured to the exterior surface 127.

At block 906, the method includes bonding, via the adhesive, a functional layer to the layer of molded material. For example, the method 900 may involve bonding, via the cement-based adhesive 122, a functional layer 120 (e.g., a foam-based additive or insulation layer) to the layer of molded material 108. In this context, the bonding may occur via a cementitious reaction between the particles 110 of one or more cementitiously active substances and the cement-based adhesive 122. Additionally, the one or more raised features 111A and 111B (not shown in FIG. 11) provide enhanced surface roughness for potentially improved bonding between the adhesive and the surface 110.

Provided below is a table containing data related to observed pull strength (e.g., nail pull strength or "Z-pull") ranges, failure modes, and average pull strength corresponding to respective features of plasterboards.

| Sample Designation | No. | z-pull, psi | Failure Mode | PDM, Average |
|---|---|---|---|---|
| None | 1 | 4 | Adhesive | 10 |
| | 2 | 16 | Adhesive | |
| | 3 | 10 | Adhesive/Interface | |
| | 4 | 13 | Adhesive | |
| | 5 | 6 | Adhesive | |
| Brushed | 1 | 13 | Adhesive/Interface | 14 |
| | 2 | 14 | Adhesive/Interface | |
| | 3 | 10 | Adhesive | |
| | 4 | 8 | Adhesive/Interface | |
| | 5 | 23 | Adhesive/Interface | |

-continued

| Sample Designation | No. | z-pull, psi | Failure Mode | PDM, Average |
|---|---|---|---|---|
| Embossed - Izmir | 1 | 20 | Interface | 17 |
| | 2 | 10 | Interface | |
| | 3 | 14 | Back Gypsum | |
| | 4 | 16 | Interface | |
| | 5 | 26 | Foam | |
| Embossed - Spiga | 1 | 29 | Foam | 26 |
| | 2 | 29 | Foam | |
| | 3 | 27 | Foam | |
| | 4 | 26 | Back Gypsum | |
| | 5 | 18 | Back Gypsum | |
| Embossed - Spiro | 1 | 27 | Foam | 22 |
| | 2 | 19 | Gypsum | |
| | 3 | 22 | Gypsum | |
| | 4 | 24 | Interface | |
| | 5 | 20 | Gypsum | |

Plasterboards labeled "None" did not have a surface polymer layer with raised features and were not brushed or otherwise treated to have enhanced surface roughness. Plasterboards labeled "brushed" were abrasively treated to have rough exposed surfaces but did not have a polymer layer with raised features. "Embossed-Izmir" plasterboards have a surface layer of molded material having raised features with a pitch of about 0.5 mm and a depth of about 60 μm. "Embossed-Spiga" plasterboards have a surface layer of molded material having raised features with a pitch of about 1 mm and a depth of about 150 μm. "Embossed-Spiro" plasterboards have a surface layer of molded material having raised features with a pitch ranging from 1 mm to 4 mm and a depth of about 70 μm.

Figure 16:
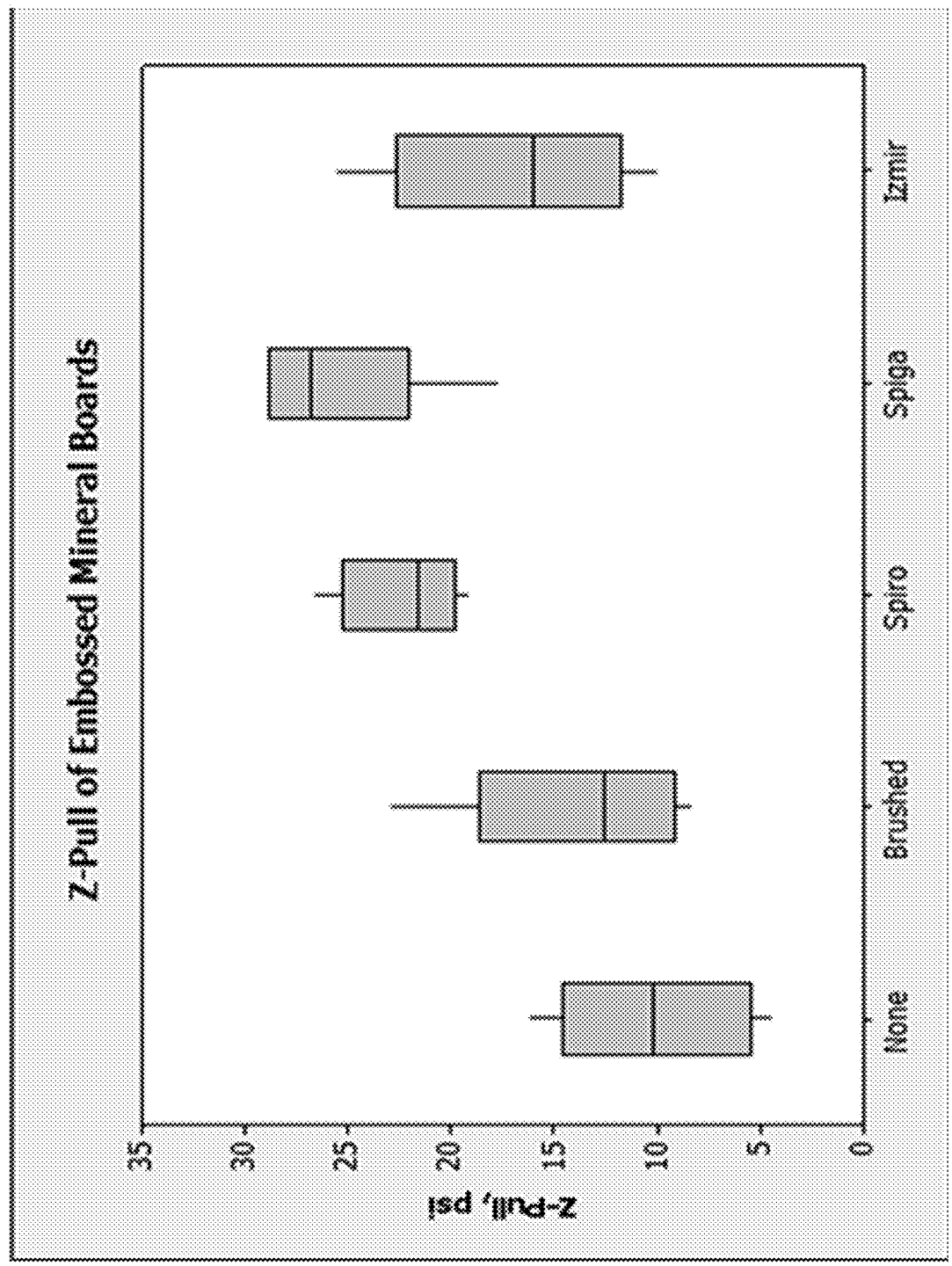
FIG. 16 is a graphical depiction of observed pull strength ranges corresponding to respective compositions of plasterboards.

FIG. 16 is a graphical depiction of observed pull strength ranges corresponding to respective features of plasterboards. As shown, plasterboards labeled "none" that do not have brushed polymer layers and do not have raised features on their exposed polymer surface had the lowest observed pull strength (an average of about 10 psi). Plasterboards labeled "brushed" that were abrasively treated to have rough exposed surfaces but did not have a polymer layer with raised features were observed to have increased pull strength (an average of about 14 psi). Plasterboards having raised features on their respective exposed layers of molded material exhibited even higher pull strength. Depending on the pattern, depth etc. of the raised features, the plasterboards exhibited average respective pull strengths of about 17 psi ("izmir"), 22 psi ("spiro"), and 26 psi ("Spiga").

Figure 17:
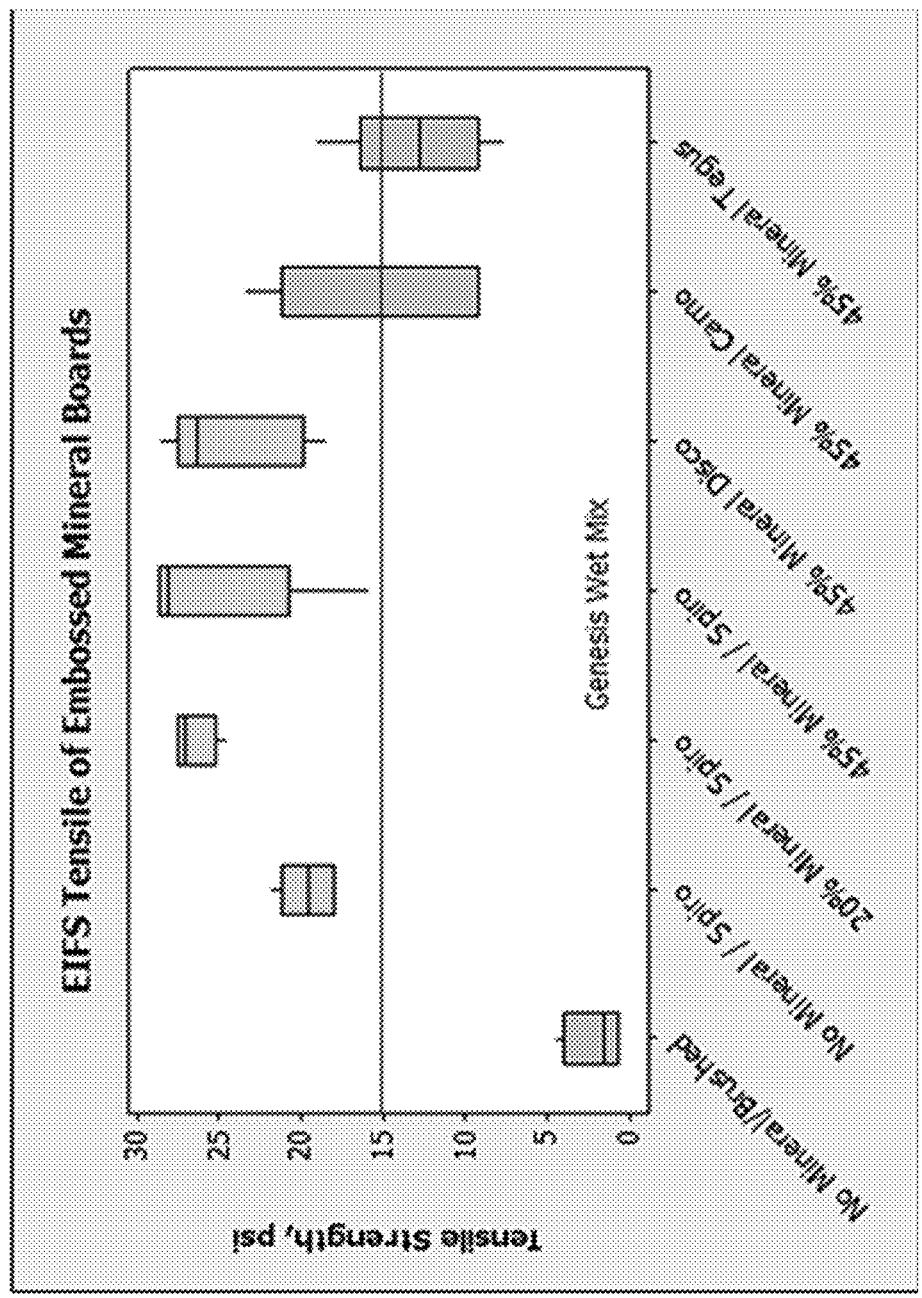
FIG. 17 is a graphical depiction of observed tensile ranges corresponding to respective compositions of plasterboards.

FIG. 17 is a graphical depiction of observed tensile strength ranges corresponding to respective features of plasterboards. As referred to below, "Tegus" plasterboards have a surface layer of molded material having raised ridges that are parallel with each other. "Camo" plasterboards have a surface layer of molded material having sections that include raised ridges that are parallel with each other within each section (see, e.g., FIG. 8). "Disco" plasterboards have a surface layer of molded material having raised features that form a honeycomb pattern (see, e.g., FIG. 7). As shown, brushed plasterboards labeled "No mineral/Brushed" that do not have cementitious mineral content or raised features on their exposed polymer surface had the lowest observed tensile strength (an average of about 2 psi). Plasterboards labeled "No mineral/Spiro" that do not have cementitious mineral content but do have a polymer layer with raised features exhibited an average tensile strength of about 19 psi. Plasterboards labeled "20% Mineral/Spiro" that have cemenititious minerals at a weight ratio within the polymer layer of 20% and have raised polymer features exhibited an average tensile strength of about 27 psi. Plasterboards labeled "45% Mineral/Spiro" that have cemenititious minerals at a weight ratio within the polymer layer of 45% and have raised polymer features exhibited an average tensile strength of about 28 psi. Plasterboards labeled "45% Mineral/Disco" that have cemenititious minerals at a weight ratio within the polymer layer of 45% and have raised polymer features exhibited an average tensile strength of about 26 psi. Plasterboards labeled "45% Mineral/Camo" that have cemenititious minerals at a weight ratio within the polymer layer of 45% and have raised polymer features exhibited a tensile strength ranging from about 10 psi to 21 psi. Plasterboards labeled "45% Mineral/Tegus" that have cemenititious minerals at a weight ratio within the polymer layer of 45% and have raised polymer features exhibited an average tensile strength of about 13 psi.

Figure 18:
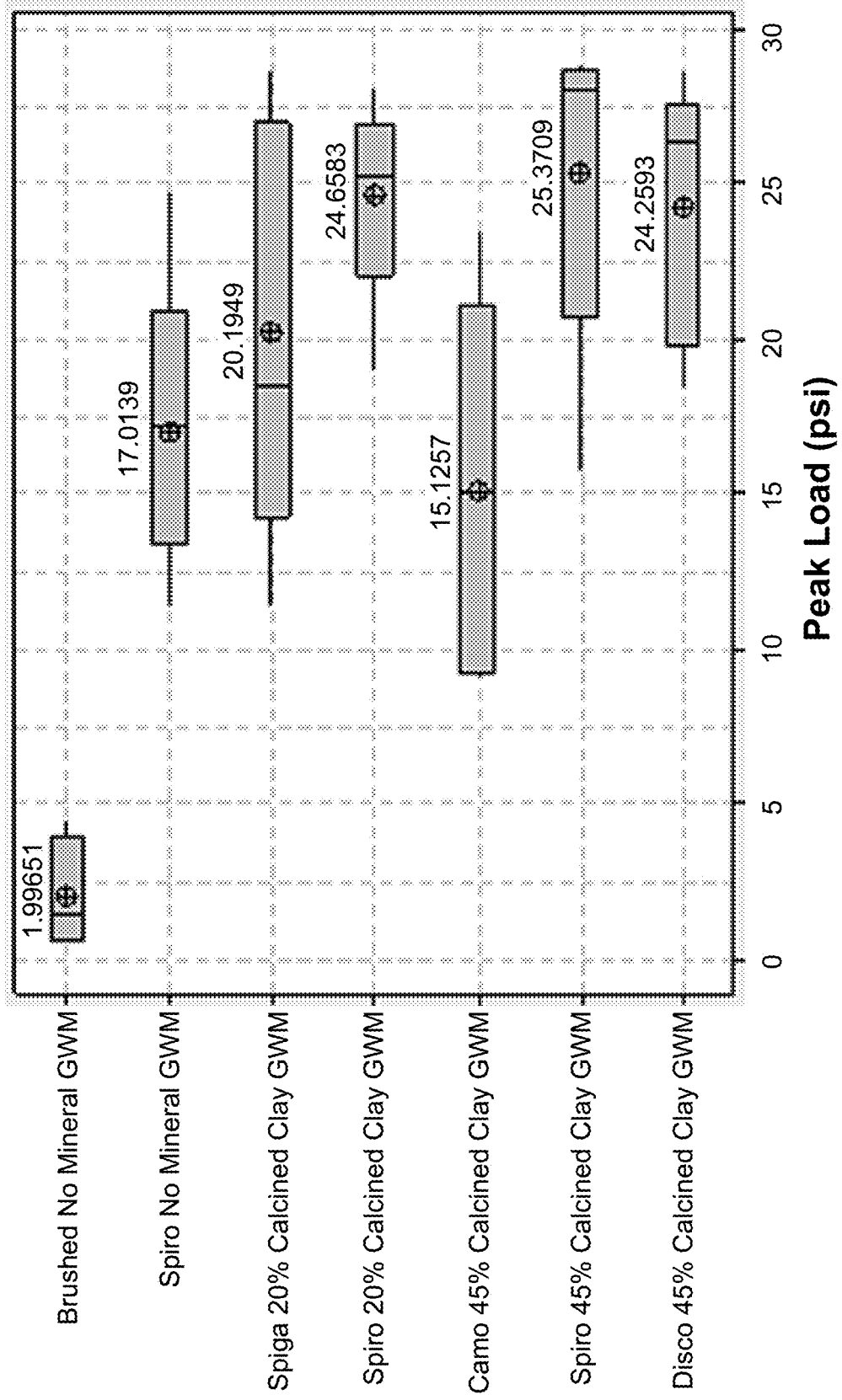
FIG. 18 is a graphical depiction of observed peak load ranges corresponding to respective compositions of plasterboards.

FIG. 18 is a graphical depiction of observed peak load ranges corresponding to respective features of plasterboards. As shown, brushed plasterboards labeled "Brushed No Mineral GVM" that do not have cementitious mineral content or raised features on their exposed polymer surface had the lowest observed peak load (an average of about 2 psi). Plasterboards labeled "Spiro No Mineral GVM" that do not have cementitious mineral content but do have a polymer layer with raised features exhibited an average peak load of about 17 psi. Plasterboards labeled "Spiga 20% Calcined Clay GVM" that have cemenititious minerals at a weight ratio within the polymer layer of 20% and have raised polymer features exhibited an average peak load of about 20.2 psi. Plasterboards labeled "Spiro 20% Calcined Clay GVM" that have cemenititious minerals at a weight ratio within the polymer layer of 20% and have raised polymer features exhibited an average peak load of about 24.66 psi. Plasterboards labeled "Camo 45% Calcined Clay GWM" that have cemenititious minerals at a weight ratio within the polymer layer of 45% and have raised polymer features exhibited an average peak load of about 15.13 psi. Plasterboards labeled "Spiro 45% Calcined Clay GVM" that have cemenititious minerals at a weight ratio within the polymer layer of 45% and have raised polymer features exhibited an average peak load of about 25.37 psi. Plasterboards labeled "Disco 45% Calcined Clay GVM" that have cemenititious minerals at a weight ratio within the polymer layer of 45% and have raised polymer features exhibited an average peak load of about 24.26 psi.

Figure 19:
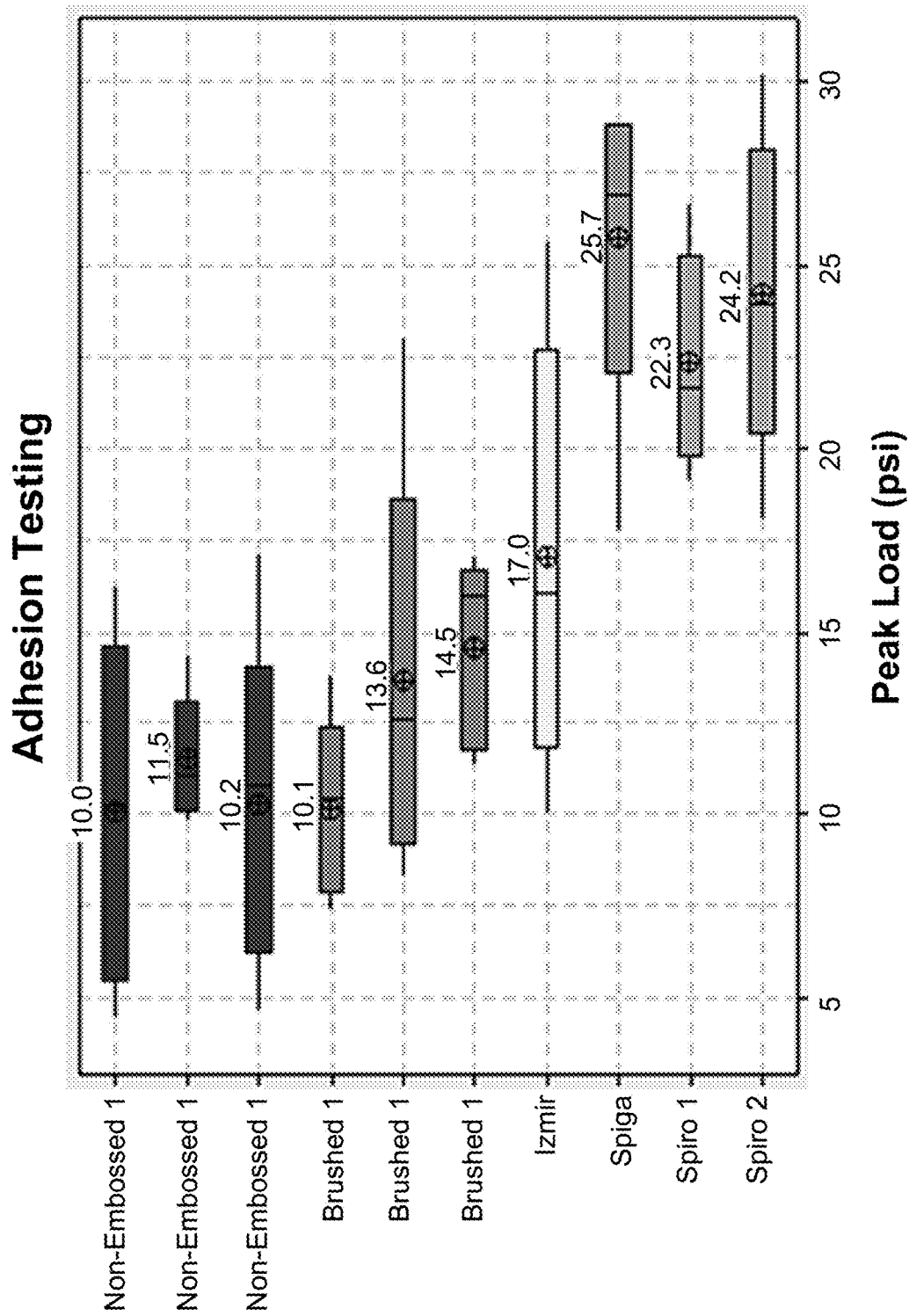
FIG. 19 is a graphical depiction of observed peak load ranges corresponding to respective features of plasterboards.

FIG. 19 is a graphical depiction of observed peak load ranges corresponding to respective features of plasterboards. Plasterboards lacking exposed polymer surfaces having raised features exhibited average peak loads of 10.0 psi, 11.5 psi, and 10.2 psi. Plasterboards having brushed exposed surfaces but lacking exposed polymer surfaces having raised features exhibited average peak loads of 10.1 psi, 13.6 psi, and 14.5 psi. A plasterboard having exposed polymer surfaces having raised features corresponding to the aforementioned "Spiga" pattern exhibited an average peak load of 25.7 psi. Plasterboards having exposed polymer surfaces having raised features corresponding to the aforementioned "Spiro" pattern exhibited respective average peak loads of 22.3 psi and 24.2 psi.

Figure 20:
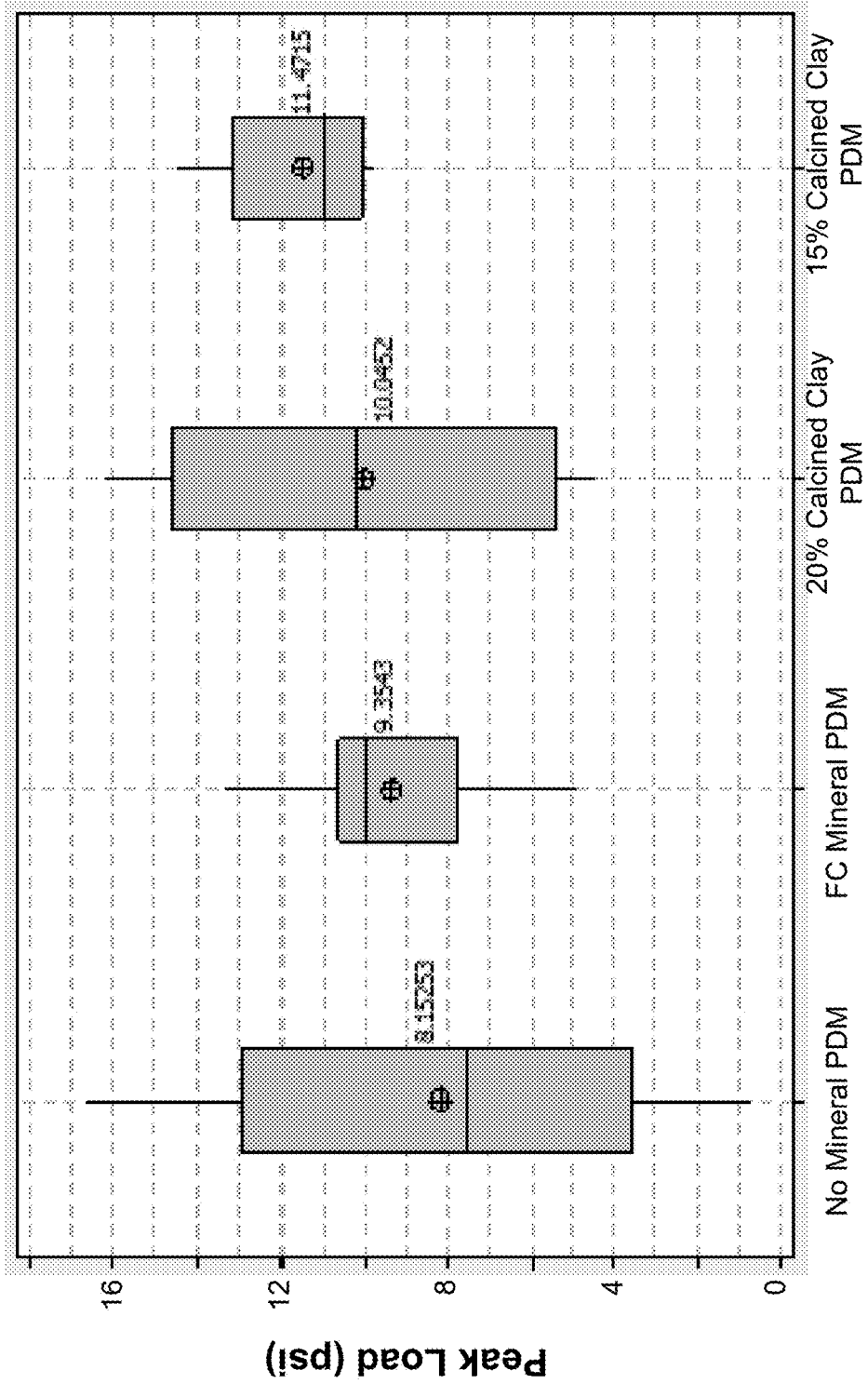
FIG. 20 is a graphical depiction of observed peak load ranges corresponding to respective compositions of plasterboards.

FIG. 20 is a graphical depiction of observed peak load ranges corresponding to respective compositions of layers of molded material disposed on plasterboards. The experimental results show that plasterboards having a layer of molded material disposed on their liners that is devoid of cementitiously active minerals exhibited a lower average peak load than plasterboards with layers of molded material that include air-floated clay, 20% calcined clay, or 15% calcined clay. According to the experimental data depicted in FIG. 20, plasterboards without cementitiously active minerals exhibited an average peak load of 8.15 psi, whereas plasterboards having air floated clay disposed within their layer of molded material exhibited an average peak load of 9.35 psi. Plasterboards having a layer of molded material composed of 20% calcined clay by weight exhibited an average peak load of 10.05 psi. Plasterboards having a layer of molded material composed of 15% calcined clay by weight exhibited an average peak load of 11.47 psi. Dryvit® Primus® cement-based adhesive was used to collect the data depicted in FIG. 10.

Figure 21:
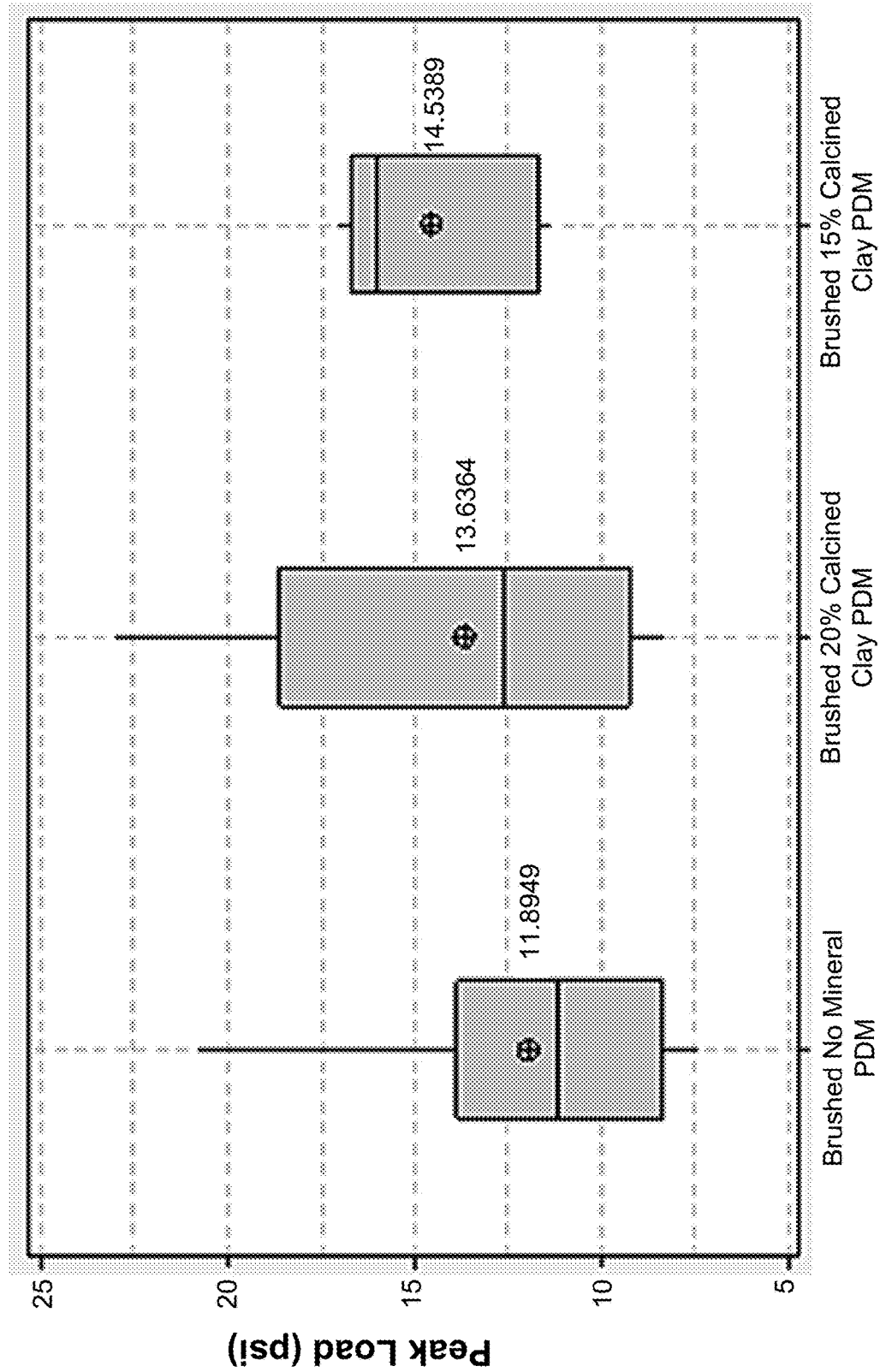
FIG. 21 is a graphical depiction of observed peak load ranges corresponding to respective compositions of plasterboards.

FIG. 21 is a graphical depiction of observed peak loads corresponding to respective compositions of layers of brushed or otherwise surface-processed molded material disposed on plasterboards. Experimental results show that plasterboards having a brushed or processed layer of molded material disposed on their liners that is devoid of cementitiously active minerals exhibited a lower average peak load than plasterboards with brushed or processed layers of molded material that includes 20% calcined clay or 15% calcined clay. According to the experimental data depicted in FIG. 21, brushed or processed plasterboards without cementitiously active minerals exhibited an average peak load of 11.89 psi. Brushed plasterboards having a layer of molded material composed of 15% calcined clay by weight exhibited an average peak load of 14.54 psi. Plasterboards having a brushed layer of molded material composed of 20% calcined clay by weight exhibited an average peak load of 13.64 psi. Dryvit® Primus® cement-based adhesive was used to collect the data depicted in FIG. 21.

Figure 23:
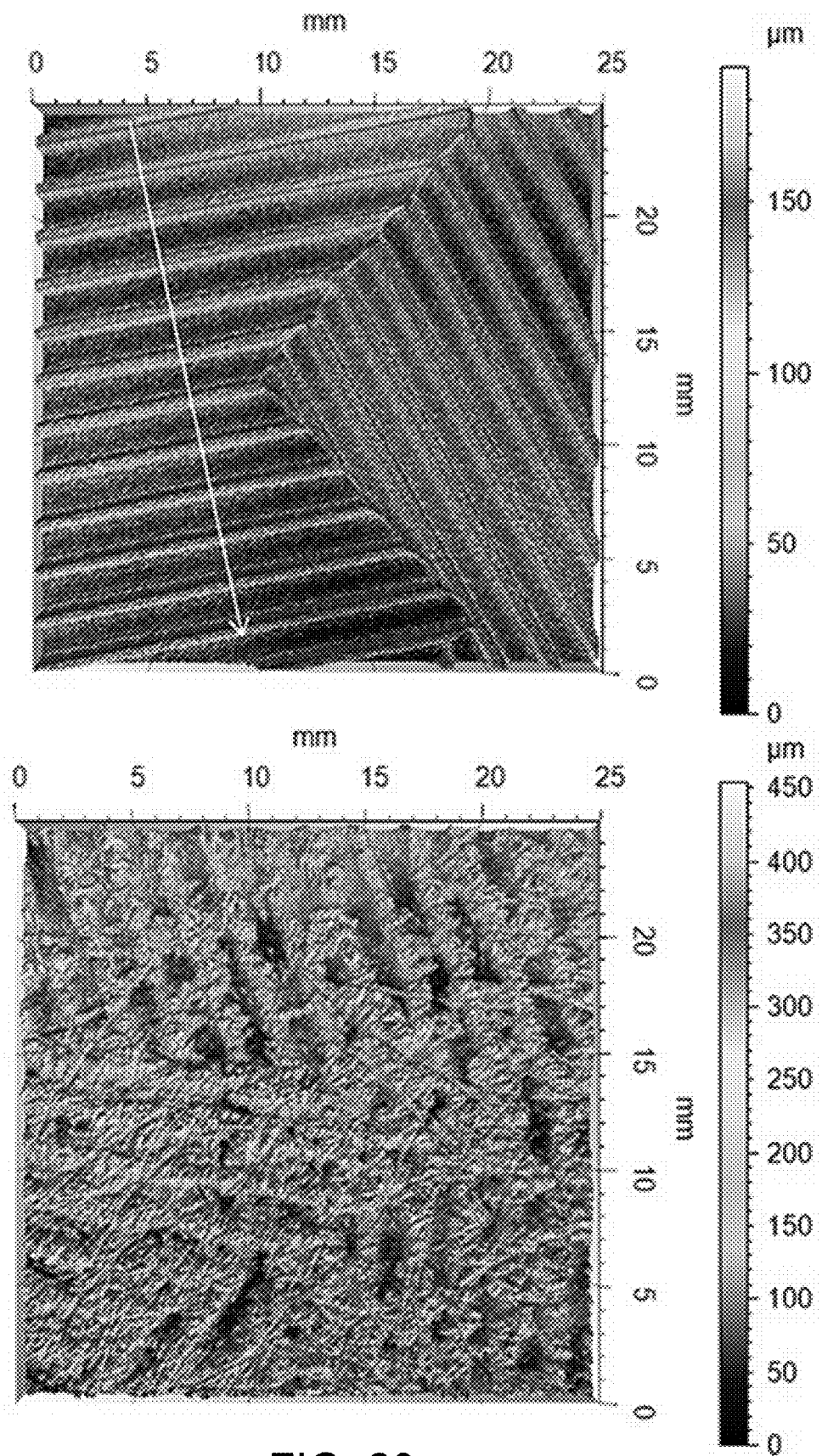
FIG. 23 profilometer scans of templates having raised features and corresponding raised features on exposed polymer layers of plasterboards.

FIGS. 22-24 show profilometer scans of templates having raised features and corresponding raised features on exposed polymer layers of plasterboards. Samples were examined using a Nanovea 3D Surface Profilometer using a white light chromatic aberration technique. Area scan size was adjusted for each embossed pattern to allow for the best feature resolution.

The top portion of FIG. 22 shows a profilometer scan of a template (e.g., the sheet 823) that corresponds to the aforementioned "Disco" pattern of raised features. The bottom portion of FIG. 22 shows raised features of a polymer layer after formation using the template. As shown, the raised features of the template have transferred reasonably well to the plasterboard.

The top portion of FIG. 23 shows a profilometer scan of a template (e.g., the sheet 823) that corresponds to the aforementioned "Camo" pattern of raised features. The bottom portion of FIG. 23 shows raised features of a polymer layer after formation using the template. As shown, the raised features of the template have transferred reasonably well to the plasterboard.

The top portion of FIG. 24 shows a profilometer scan of a template (e.g., the sheet 823) that corresponds to the aforementioned "Tegus" pattern of raised features. The bottom portion of FIG. 24 shows raised features of a polymer layer after formation using the template. As shown, the raised features of the template have transferred reasonably well to the plasterboard.

Figure 25:
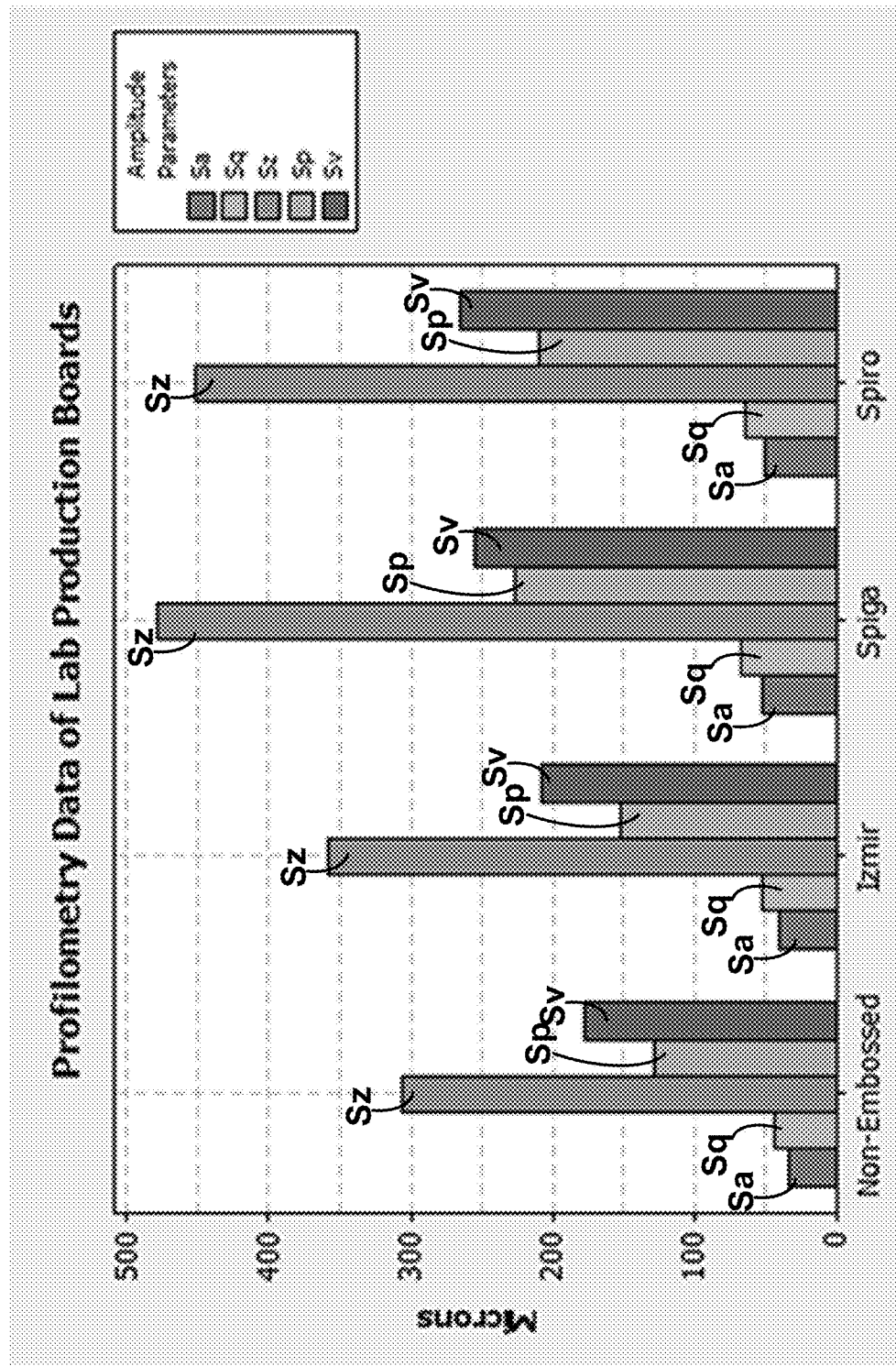
FIG. 25 shows observed roughness characteristics for various plasterboards.
Figure 26:
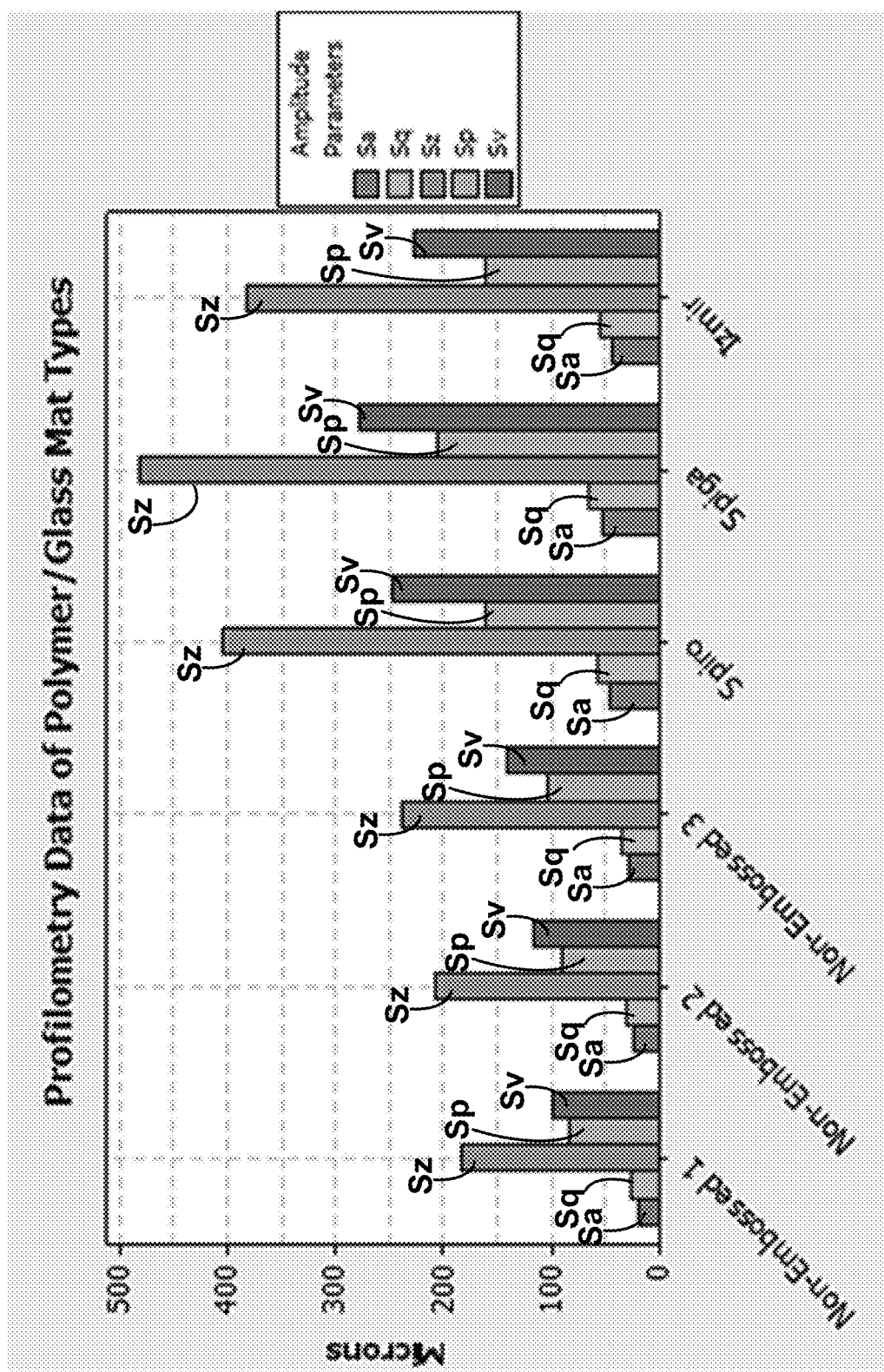
FIG. 26 shows observed roughness characteristics for various plasterboards.

FIGS. 25 and 26 show observed roughness characteristics for various plasterboards. With reference to FIGS. 25 and 26, "Sa" is defined as the arithmetic mean deviation of the surface of the plasterboard. "Sq" is defined as the root mean square (RMS) deviation of the surface of the plasterboard. "Sz" is defined as the ten point height of the surface, i.e., mean of distance between the 5 highest peaks and the 5 deepest holes. "Sp" is defined as the height between the highest peak on the surface of the plasterboard and the mean height of the surface. "Sv" is defined as the height between the mean height of the surface and the deepest trough on the surface.

The profilometry data shown in FIGS. 25 and 26 demonstrates that plasterboard polymer layers having raised features exhibit higher roughness (e.g., greater surface area) than conventional plasterboards. Of note, this also shows that the features imparted to the polymer layer during formation of the polymer layer generally survive the drying process.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A plasterboard assembly comprising:
   a plasterboard comprising:
      a layer of hardened plaster material having a first surface and an opposed second surface;
      a layer of molded material having a surface that faces away from the layer of hardened plaster material, the surface of the layer of molded material having a plurality of raised features; and
      a liner between the first surface of the layer of hardened plaster material and the layer of molded material; and,
   an insulation layer that is a foam-based material or mineral wool bonded to a surface of the layer of molded material that faces away from the liner.

2. The plasterboard assembly of claim 1, wherein the insulation layer is bonded to the layer of molded material via a cement-based adhesive, and wherein the layer of molded material includes particles of one or more cementitiously-active substances mixed therein.

3. The plasterboard assembly of claim 1, wherein the plasterboard assembly forms part of an exterior facade of a building.

4. The plasterboard assembly of claim 1, wherein the liner of the plasterboard is disposed on the first surface of the layer of hardened plaster material and the layer of molded material is disposed on the liner.

5. The plasterboard assembly of claim 4, wherein the plasterboard includes a second liner disposed on the second surface of the layer of hardened plaster material, and
   wherein the second liner is in contact with an exterior frame of a building.

6. The plasterboard assembly of claim 1, wherein the raised features occupy a fraction of a surface area of the molded layer in the range of 20-80%.

7. The plasterboard assembly of claim 1, wherein the raised features have an average spacing between features in the range of 0.1 mm to 5 mm.

8. The plasterboard assembly of claim 1, wherein
   the raised features have an average spacing between features in the range of 0.1 mm to 5 mm;
   the raised features have depths within a range of 10-500 µm.

9. The plasterboard assembly of claim 1, wherein the raised features have depths within a range of 10-500 µm.

10. The plasterboard assembly of claim 1, wherein the raised features have an average spacing within a range of 1 mm to 5 mm.

11. The plasterboard assembly of claim 1, wherein the hardened plaster material comprises a gypsum material.

12. The plasterboard assembly of claim 1, wherein the first surface of the layer of hardened plaster material and/or the liner have shapes that substantially conform to the one or more raised features of the layer of molded material.

13. The plasterboard assembly of claim 1, wherein the surfaces of the liner and/or the layer of hardened plaster material do not substantially conform to the surface texture of the layer of molded material.

14. The plasterboard assembly of claim 13, wherein the surfaces of the liner and/or the layer of hardened plaster material are substantially flat.

15. The plasterboard assembly of claim 1, wherein the molded material is a polymeric material or is a substantially inorganic material.

16. The plasterboard assembly of claim 1, wherein the raised features cover at least 75% of a surface of the liner that faces away from the first surface of the layer of hardened plaster material.

17. The plasterboard assembly of claim 1, wherein the layer of molded material has a thickness within a range of 10 μm to 7000 μm.

18. The plasterboard assembly of claim 1, wherein the raised features comprise one or more features having a depth within a range of 10-7000 μm.

19. The plasterboard assembly of claim 1, wherein the raised features comprise one or more features having a depth within a range of 100-3000 μm.

20. The plasterboard of assembly of claim 1, wherein the raised features have one or more of a cross-hatched pattern or a honeycomb pattern.

21. The plasterboard of assembly of claim 1, wherein the raised features comprise a plurality of raised ridges that are parallel to each other.

22. The plasterboard assembly of claim 1, wherein the one or more raised features comprise:
  a first plurality of raised ridges that are substantially parallel to each other; and
  a second plurality of raised ridges that are substantially parallel to each other,
  wherein the raised ridges of the first plurality are not parallel with the raised ridges of the second plurality.

23. The plasterboard assembly of claim 22, wherein the one or more raised features comprise:
  a first section that comprises the first plurality of raised ridges; and
  a second section that comprises the second plurality of raised ridges,
  wherein the first section is adjacent to the second section.

24. A method of installing the plasterboard assembly of claim 1, the method comprising:
  securing the plasterboard to an exterior surface of a building such that the layer of molded material faces away from the exterior surface of the building;
  applying an adhesive onto the layer of molded material; and
  bonding, via the adhesive, the insulation layer to the molded material.

* * * * *